US00RE48371E

(19) United States
(12) Reissued Patent
Zhu et al.

(10) Patent Number: US RE48,371 E
(45) Date of Reissued Patent: Dec. 29, 2020

(54) MICROPHONE ARRAY SYSTEM

(71) Applicant: LI Creative Technologies, Inc., Florham Park, NJ (US)

(72) Inventors: Manli Zhu, New City, NY (US); Qi Li, New Providence, NJ (US)

(73) Assignee: VOCALIFE LLC, Plano, TX (US)

(21) Appl. No.: 16/052,623

(22) Filed: Aug. 2, 2018

Related U.S. Patent Documents

Reissue of:

(64) Patent No.: 8,861,756
Issued: Oct. 14, 2014
Appl. No.: 13/049,877
Filed: Mar. 16, 2011

U.S. Applications:

(63) Continuation of application No. 15/293,626, filed on Oct. 14, 2016, now Pat. No. Re. 47,049, which is an application for the reissue of Pat. No. 8,861,756.
(Continued)

(51) Int. Cl.
*H04R 25/00* (2006.01)
*H03G 3/20* (2006.01)
(Continued)

(52) U.S. Cl.
CPC ..... *G01S 3/8055* (2013.01); *G01S 3/801* (2013.01); *G01S 5/22* (2013.01); *H04R 1/406* (2013.01);
(Continued)

(58) Field of Classification Search
CPC .. H04R 3/005; H04R 1/406; H04R 2201/401; H04R 2201/403; G01S 3/801; G01S 8/055; G01S 5/22; H04M 3/568
(Continued)

(56) References Cited

U.S. PATENT DOCUMENTS 5,315,562 A * 5/1994 Bradley et al. ..... 367/89
5,825,898 A 10/1998 Marash
(Continued)

FOREIGN PATENT DOCUMENTS

EP 1538867 A1 6/2005
KR 20090128221 A 12/2009
(Continued)

OTHER PUBLICATIONS

US 9,711,140 B2, 07/2017, Ayrapetian et al. (withdrawn)
(Continued)

*Primary Examiner* — Ovidio Escalante
(74) *Attorney, Agent, or Firm* — Ashok Tankha

(57) ABSTRACT

A method and system for enhancing a target sound signal from multiple sound signals is provided. An array of an arbitrary number of sound sensors positioned in an arbitrary configuration receives the sound signals from multiple disparate sources. The sound signals comprise the target sound signal from a target sound source, and ambient noise signals. A sound source localization unit, an adaptive beamforming unit, and a noise reduction unit are in operative communication with the array of sound sensors. The sound source localization unit estimates a spatial location of the target sound signal from the received sound signals. The adaptive beamforming unit performs adaptive beamforming by steering a directivity pattern of the array of sound sensors in a direction of the spatial location of the target sound signal, thereby enhancing the target sound signal and partially suppressing the ambient noise signals, which are further suppressed by the noise reduction unit.

20 Claims, 34 Drawing Sheets

Related U.S. Application Data

(60) Provisional application No. 61/403,952, filed on Sep. 24, 2010.

(51) Int. Cl.

| | |
|---|---|
| ***G01S 3/805*** | (2006.01) |
| ***G01S 3/801*** | (2006.01) |
| ***G01S 5/22*** | (2006.01) |
| ***H04R 1/40*** | (2006.01) |
| ***H04R 3/00*** | (2006.01) |
| *H04M 3/56* | (2006.01) |

(52) U.S. Cl.
CPC ..... *H04R 3/005* (2013.01); *H04M 3/568* (2013.01); *H04R 2201/401* (2013.01); *H04R 2201/403* (2013.01)

(58) Field of Classification Search
USPC ..... 381/300, 57
See application file for complete search history.

(56) References Cited

U.S. PATENT DOCUMENTS

| | | | | |
|---|---|---|---|---|
| 6,198,693 | B1 | 3/2001 | Marash | |
| 6,236,862 | B1 * | 5/2001 | Erten | G01S 3/00 370/342 |
| 7,039,199 | B2 | 5/2006 | Rui | |
| 7,068,801 | B1 | 6/2006 | Stinson et al. | |
| 7,970,151 | B2 | 6/2011 | Oxford et al. | |
| 8,855,295 | B1 | 10/2014 | Chhetri et al. | |
| 8,885,815 | B1 | 11/2014 | Velusamy et al. | |
| 8,953,777 | B1 | 2/2015 | Chhetri | |
| 8,983,057 | B1 | 3/2015 | Deng et al. | |
| 9,116,962 | B1 | 8/2015 | Pance | |
| 9,229,526 | B1 | 1/2016 | Neglur et al. | |
| 9,319,782 | B1 | 4/2016 | Crump et al. | |
| 9,319,783 | B1 | 4/2016 | Barton et al. | |
| 9,332,167 | B1 | 5/2016 | Pance | |
| 9,354,731 | B1 | 5/2016 | Pance et al. | |
| 9,363,616 | B1 | 6/2016 | Chu et al. | |
| 9,373,338 | B1 | 6/2016 | Gopalan et al. | |
| 9,390,723 | B1 | 7/2016 | McDonough, Jr. et al. | |
| 9,423,886 | B1 | 8/2016 | Neglur et al. | |
| 9,431,982 | B1 | 8/2016 | Yang et al. | |
| 9,432,768 | B1 | 8/2016 | O'Neill et al. | |
| 9,432,769 | B1 | 8/2016 | Sundaram et al. | |
| 9,456,276 | B1 | 9/2016 | Chhetri | |
| 9,473,646 | B1 | 10/2016 | Chhetri | |
| 9,516,410 | B1 | 12/2016 | Ayrapetian et al. | |
| 9,521,249 | B1 | 12/2016 | Chhetri | |
| 9,589,575 | B1 | 3/2017 | Ayrapetian et al. | |
| 9,591,404 | B1 | 3/2017 | Chhetri | |
| 9,614,486 | B1 | 4/2017 | Yang et al. | |
| 9,653,060 | B1 | 5/2017 | Hilmes et al. | |
| 9,658,738 | B1 | 5/2017 | Park et al. | |
| 9,659,555 | B1 | 5/2017 | Hilmes et al. | |
| 9,661,438 | B1 | 5/2017 | Yang et al. | |
| 9,677,986 | B1 | 6/2017 | Baldwin et al. | |
| 9,678,559 | B1 | 6/2017 | Devries et al. | |
| 9,689,960 | B1 | 6/2017 | Barton et al. | |
| 9,704,478 | B1 | 7/2017 | Vitaladevuni et al. | |
| 9,734,845 | B1 | 8/2017 | Liu et al. | |
| 9,747,899 | B2 | 8/2017 | Pogue et al. | |
| 9,747,920 | B2 | 8/2017 | Ayrapetian et al. | |
| 9,754,605 | B1 | 9/2017 | Chhetri | |
| 9,767,828 | B1 | 9/2017 | Velusamy et al. | |
| 9,818,425 | B1 | 11/2017 | Ayrapetian et al. | |
| 9,820,036 | B1 | 11/2017 | Tritschler et al. | |
| 9,837,099 | B1 | 12/2017 | Sundaram et al. | |
| 9,918,163 | B1 | 3/2018 | Ayrapetian et al. | |
| 9,940,949 | B1 | 4/2018 | Vitaladevuni et al. | |
| 9,966,059 | B1 | 5/2018 | Ayrapetian et al. | |
| 9,967,661 | B1 | 5/2018 | Hilmes et al. | |
| 9,973,848 | B2 | 5/2018 | Chhetri et al. | |
| 9,973,849 | B1 | 5/2018 | Zhang et al. | |
| 9,978,387 | B1 | 5/2018 | Pogue et al. | |
| 9,997,151 | B1 | 6/2018 | Ayrapetian et al. | |
| 10,062,372 | B1 | 8/2018 | Barton et al. | |
| 10,109,294 | B1 | 10/2018 | Ayrapetian et al. | |
| 10,147,439 | B1 | 12/2018 | Kristjansson et al. | |
| 10,147,441 | B1 | 12/2018 | Pogue et al. | |
| 10,229,698 | B1 | 3/2019 | Chhetri | |
| 10,237,647 | B1 | 3/2019 | Chhetri | |
| 10,242,695 | B1 | 3/2019 | Velusamy et al. | |
| 10,244,313 | B1 | 3/2019 | O'Neill et al. | |
| 10,304,475 | B1 | 5/2019 | Wang et al. | |
| 2003/0204397 | A1 * | 10/2003 | Amiri et al. | 704/231 |
| 2004/0071284 | A1 | 4/2004 | Abutalebi et al. | |
| 2004/0161121 | A1 * | 8/2004 | Chol et al. | 381/92 |
| 2006/0153360 | A1 | 7/2006 | Kellermann et al. | |
| 2006/0245601 | A1 | 11/2006 | Michaud et al. | |
| 2006/0269080 | A1 | 11/2006 | Oxford et al. | |
| 2007/0055505 | A1 | 3/2007 | Doclo et al. | |
| 2007/0076898 | A1 | 4/2007 | Sarroukh et al. | |
| 2008/0112574 | A1 | 5/2008 | Brennan et al. | |
| 2008/0181430 | A1 | 7/2008 | Zhang et al. | |
| 2008/0232607 | A1 | 9/2008 | Tashev et al. | |
| 2009/0067642 | A1 | 3/2009 | Buck et al. | |
| 2009/0073040 | A1 | 3/2009 | Sugiyama | |
| 2009/0141907 | A1 * | 6/2009 | Kim et al. | 381/71.7 |
| 2009/0279714 | A1 | 11/2009 | Kim et al. | |
| 2009/0304200 | A1 | 12/2009 | Kim et al. | |
| 2010/0150364 | A1 | 6/2010 | Buck et al. | |
| 2012/0327115 | A1 | 12/2012 | Chhetri et al. | |
| 2013/0265276 | A1 | 10/2013 | Obeidat et al. | |
| 2015/0006176 | A1 | 1/2015 | Pogue et al. | |
| 2017/0178662 | A1 | 6/2017 | Ayrapetian et al. | |
| 2018/0130468 | A1 | 5/2018 | Pogue et al. | |
| 2018/0182387 | A1 | 6/2018 | Chua et al. | |

FOREIGN PATENT DOCUMENTS

| | | | |
|---|---|---|---|
| RS | WO2008041878 | A2 | 4/2008 |
| SG | 2006006935 | A1 | 1/2006 |
| WO | 2008041878 | A2 | 4/2008 |
| WO | WO2008041878 | A2 | 4/2008 |
| WO | 2013155098 | A1 | 10/2013 |
| WO | 2017105998 | A1 | 6/2017 |
| WO | 2018118895 | A2 | 6/2018 |

OTHER PUBLICATIONS

Qi (Peter) Li, "A Portable USB-Based Mirophone Array Device For Robust Speech Recognition", "2009 IEEE International Conference on Acoustics, Speech, and Signal Processing", Apr. 19-24, 2009, Seven pages.

Osamu Hoshuyama, Akihiko Sugiyama, and Akihiro Hirano, A Robust Adaptive Beamformer for Microphone Arrays with a Blocking Matrix Using Constrained Adaptive Filters, IEEE Transactions on Signal Processing, vol. 47, No. 10, Oct. 1999, 8 Pgs.

Cha Zhang, Dinei Florencio, Demba E. Ba, and Zhengyou Zhang, Maximum Likelihood Sound Source Localization and Beamforming for Directional Microphone Arrays in Distributed Meetings, IEEE Transactions on Multimedia, vol. 10, No. 3, Apr. 2008, 11 pages Afsaneh Asaei, Mohammad Javad Taghizadeh, Marjan Bahrololum, Mohammed Ghanbari, Verified speaker localization utiiizing voicing level in split-bands Signal Processing 89 (2009) 1038-1049, 12 pages.

Scott Matthew Griebel, A Microphone Array System for Speech Source Localization, Denoising and Dereverberation, Thesis, The Division of Engineering and Applied Sciences,Harvard University,Cambridge,Massachusetts, Apr. 2002 163 pages.

Cha Zhang, Dinei Florencio, Demba E. Ba, Zhengyou Zhang, Maximum Likelihood Sound Source Localization and Beamforming for Directional Microphone Arrays in Distributed Meetings, Journal of Latex Class files, vol. 6, No. 1, Jan. 2007, 10 pages.

(56) References Cited

OTHER PUBLICATIONS

Michael Brandstein, Darren Ward Microphone Arrays,Signal Processing Techniques and Applications Springer-Verlag,Berlin,Heidelberg,New York in 2001, 401 pages.
Qi (Peter) Li, Manli Zhu, and Wei Li, "A Portable USB-Based Mirophone Array Device For Robust Speech Recognition", "2009 IEEE International Conference on Acoustics, Speech, and Signal Processing", Apr. 19-24, 2009, 7 pages.
Ivan J. Tashev, Sound Capture and Processing Practical Approaches, 2009 Wiley Publisher, 196 pages.
Manli Zhu, Qi (Peter) Li, Joshua J. Hajicek Circular and Linear Microphone Arrays for Robust Speech Recognition and Conference Phone, ICASSP 2009 Thursday, Apr. 23, 2009, 1 page.
Harry L. Van Trees Arrays and Spatial Filters, Optimum Array Processing: Part IV of Detection, Estimation, and Modulation Theory, John Wiley & Sons, Inc., 73 pages.
Introducing First Low-cost, Light-weight, and Portable USB Array Microphone for Consumer Market, Li Creative Technologies, Inc., Feb. 2. 2010, 1 page.
Crispmic USB-Based Microphone Array for Laptops and PCs LI Creative Technologies, Inc. 2 pages.
Matthias Wolfel and John McDonough Distant Speech Recognition A John Wiley and Sons, Ltd. Publication, 2009, 592 pages.
Darpa 172 Phase I Selections from the 07.2 Solicitation, 69 pages.
Doh H. Johnson and Dan E. Dudgeon Array Signal Processing: Concepts and Techniques, 1993 Prentice Hall Signal Processing Series, 554 pages.
Group Videoconferencing Systems: Video Made Easy HD5000 Series, Multimedia Workgroup Conferencing System, Installation & Setup Guide, 70 pages.
Andrea DA-350 Microphone Performance, 1 page.
VCON—Solutions—Videoconferencing—Group Video Products MediaConnect 9000 Sep. 21, 2003-Feb. 8, 2004, 1 page.
DA-350 Hands Free Linear Array Microphone, 1 page.
DA-350 Auto Array Feb. 25, 2006-Jun. 29, 2016, 1 page.
VCON Group Videoconferencing Systems HD4000 Software-only Multimedia Videoconferencing Version 3.5, 50 pages.
MediaConnect 9000 A workgroup conferencing system for medium and large room environments, 1 page.
VCON Group Videoconferencing Systems HD5000 Series Rollabout and Compact Systems Installation & Setup Guide, 74 pages.
Baruch Berdugo, Miriam A. Doron, Judith Rosenhouse, Haim Azhari On direction finding of an emitting source from time delays 33 pages.
EchoStop, Digital Noise Reduction Technology, 1 page.
VCON—Hardware Addons—Introducing VoiceFinder, Sep. 23, 2003-Feb. 25, 2004, 2 pages.
Digital Super Directional Array (DSDA® 2.0) Far-Field Microphone Technology, 1 page.
Harry L. Van Trees Optimum Array Processing, Part IV of Detection, Estimation, and Modulation Theory A John Wiley & Sons, Inc., Publication, 192 pages.
Charles H. Knapp and G. Clifford Carter The Generalized Correlation Method for Estimation of Time Delay IEEE transactions on acoustics, speech, and signal processing, Vol, ASSP-24, No. 4, Aug. 1976, 8 pages.
PureAudio 2.0 Noise Reduction Algorithm, 1 page.
Andrea's Technologies Overview Oct. 21, 2001-Sep. 11, 2011, 4 pages.
VCON—Hardware Addons—VoiceFinder Sep. 23, 2003-Feb. 8, 2004, 1 page.
Joseph Marash DSDA, Andrea Electronics Corporation Technology, 4 pages.
Joseph Hector Dibiase, A High-Accuracy, Low-Latency Technique for Talker Localization in Reverberant Environments Using Microphone Arrays, Thesis, Division of Engineering at Brown University, Providence, Rhode Island, May 2000, 122 pages.
Qi Li, Manli Zhu, Wei Li A portable USB-based microphone array device for robustn speech recognition IEEE International Conference on Acoustics, Speech and Signal Processing, Apr. 19-24, 2009, 2 pages.
Qi (Peter) Li, Manli Zhu, and Wei Li A Portable Usb-Based Mirophone Array Device For Robust Speech Recognition IEEE International Conference on Acoustics, Speech and Signal Processing Proceedings, Apr. 19-24, 2009, 7 pages.
John Mcdonough, Kenichi Kumatani, Matthias Wolfel,Tobias Gehrig,Emilian Stoimenov, Uwe Mayer, Stefan Schacht, and Dietrich Klakow To Separate Speech! A System for Recognizing Simultaneous Speech, Jun. 2007, 13 pages.
Dmitry N. Zotkin , Ramani Duraiswami Accelerated Speech Source Localization via a Hierarchical Search of Steered Response Power University of Maryland,MD,USA , 20 pages.
Jacek Dmochowski, Jacob Benesty, Sofiane Affes Direction of Arrival Estimation Using the Parameterized Spatial Correlation Matrix, IEEE Transaction on Audio, Speech, and Language Processing, vol. 15, No. 4, May 2007.

* cited by examiner

| Sound Sensor | Distance (m) | Delay τ (number of samples) |
|---|---|---|
| M0 | $d*\cos(\theta+\Phi_0)$ | $d*\cos(\theta+\Phi_0)*f_s/c$ |
| M1 | $d*\cos(\theta-\Phi_1)$ | $d*\cos(\theta-\Phi_1)*f_s/c$ |
| M2 | $-d*\cos(\theta+\Phi_2)$ | $-d*\cos(\theta+\Phi_2)*f_s/c$ |
| M3 | $-d*\cos(\theta-\Phi_3)$ | $-d*\cos(\theta-\Phi_3)*f_s/c$ |

FIG. 6A

| Sound Sensor Position | Distance (m) | Delay τ (number of samples) |
|---|---|---|
| 0° | $-d*\cos(\theta)$ | $-d*\cos(\theta)*f_s/c$ |
| 180° | $d*\cos(\theta)$ | $d*\cos(\theta)*f_s/c$ |
| 90° | $-d*\sin(\theta)$ | $-d*\sin(\theta)*f_s/c$ |
| -90° | $d*\sin(\theta)$ | $d*\sin(\theta)*f_s/c$ |
| Φ clockwise away from 0° ($0\leq\Phi\leq90°$) | $-d*\cos(\theta-\Phi)$ | $-d*\cos(\theta-\Phi)*f_s/c$ |
| Φ anticlockwise away from 0° ($0\leq\Phi\leq90°$) | $-d*\cos(\theta+\Phi)$ | $-d*\cos(\theta+\Phi)*f_s/c$ |
| Φ clockwise away from 180° ($0\leq\Phi\leq90°$) | $d*\cos(\theta-\Phi)$ | $d*\cos(\theta-\Phi)*f_s/c$ |
| Φ anticlockwise away from 180° ($0\leq\Phi\leq90°$) | $d*\cos(\theta+\Phi)$ | $d*\cos(\theta+\Phi)*f_s/c$ |

FIG. 6B

| | | | |
|---|---|---|---|
| $\tau_0 =$ $d*fs*\cos(\theta+\Phi_0)\sin(\Psi)/c$ | $\tau_1 =$ $d*fs*\cos(\theta-\Phi_1)\sin(\Psi)/c$ | $\tau_2 =$ $-d*fs*\cos(\theta+\Phi_2)\sin(\Psi)/c$ | $\tau_3 =$ $-d*fs*\cos(\theta-\Phi_3)\sin(\Psi)/c$ |

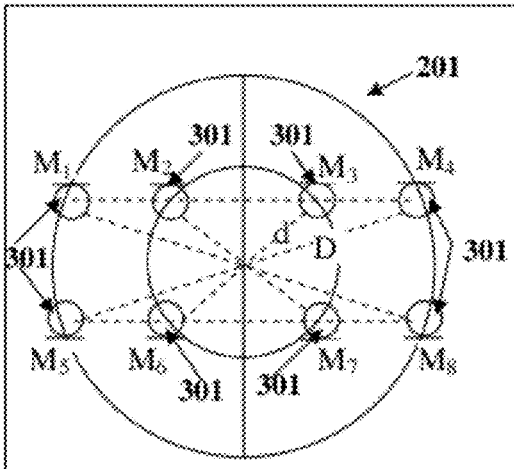

| |
|---|
| $\tau_1=D*\cos(\theta+\Phi_1)$ |
| $\tau_2=d*\cos(\theta+\Phi_2)$ |
| $\tau_3=d*\cos(\theta-\Phi_3)$ |
| $\tau_4=D*\cos(\theta-\Phi_4)$ |
| $\tau_5=-D*\cos(\theta-\Phi_5)$ |
| $\tau_6=-d*\cos(\theta-\Phi_6)$ |
| $\tau_7=-d*\cos(\theta+\Phi_7)$ |
| $\tau_8=-D*\cos(\theta+\Phi_8)$ |

FIG. 19A

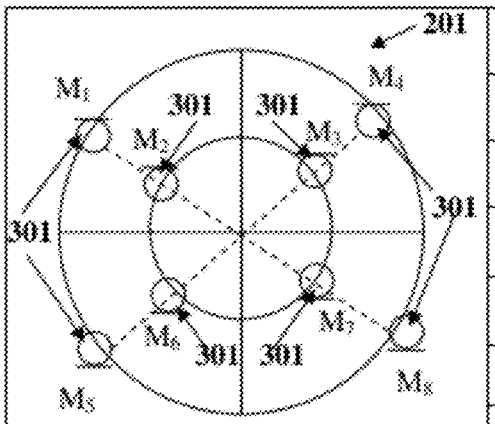

| |
|---|
| $\tau_1=D*\cos(\theta+\Phi_{12})$ |
| $\tau_2=d*\cos(\theta+\Phi_{12})$ |
| $\tau_3=d*\cos(\theta-\Phi_{34})$ |
| $\tau_4=D*\cos(\theta-\Phi_{34})$ |
| $\tau_5=-D*\cos(\theta-\Phi_{56})$ |
| $\tau_6=-d*\cos(\theta-\Phi_{56})$ |
| $\tau_7=-d*\cos(\theta+\Phi_{78})$ |
| $\tau_8=-D*\cos(\theta+\Phi_{78})$ |

FIG. 19B

MICROPHONE ARRAY SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a continuation reissue application of patent application Ser. No. 15/293,626 titled "Microphone Array System", filed on Oct. 14, 2016 in the United States Patent and Trademark Office, which is a re-issue application of U.S. patent application Ser. No. 13/049,877 titled "Microphone Array System", filed on Mar. 16, 2011 in the United States Patent and Trademark Office* (*now U.S. Pat. No. 8,861,756*), *which* claims the benefit of provisional patent application No. 61/403,952 titled "Microphone array design and implementation for telecommunications and handheld devices", filed on Sep. 24, 2010 in the United States Patent and Trademark Office.

The specification of the above referenced patent application is incorporated herein by reference in its entirety.

BACKGROUND

Microphones constitute an important element in today's speech acquisition devices. Currently, most of the hands-free speech acquisition devices, for example, mobile devices, lapels, headsets, etc., convert sound into electrical signals by using a microphone embedded within the speech acquisition device. However, the paradigm of a single microphone often does not work effectively because the microphone picks up many ambient noise signals in addition to the desired sound, specifically when the distance between a user and the microphone is more than a few inches. Therefore, there is a need for a microphone system that operates under a variety of different ambient noise conditions and that places fewer constraints on the user with respect to the microphone, thereby eliminating the need to wear the microphone or be in close proximity to the microphone.

To mitigate the drawbacks of the single microphone system, there is a need for a microphone array that achieves directional gain in a preferred spatial direction while suppressing ambient noise from other directions. Conventional microphone arrays include arrays that are typically developed for applications such as radar and sonar, but are generally not suitable for hands-free or handheld speech acquisition devices. The main reason is that the desired sound signal has an extremely wide bandwidth relative to its center frequency, thereby rendering conventional narrowband techniques employed in the conventional microphone arrays unsuitable. In order to cater to such broadband speech applications, the array size needs to be vastly increased, making the conventional microphone arrays large and bulky, and precluding the conventional microphone arrays from having broader applications, for example, in mobile and handheld communication devices. There is a need for a microphone array system that provides an effective response over a wide spectrum of frequencies while being unobtrusive in terms of size.

Hence, there is a long felt but unresolved need for a broadband microphone array and broadband beamforming system that enhances acoustics of a desired sound signal while suppressing ambient noise signals.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated need for enhancing acoustics of a target sound signal received from a target sound source, while suppressing ambient noise signals. As used herein, the term "target sound signal" refers to a sound signal from a desired or target sound source, for example, a person's speech that needs to be enhanced. A microphone array system comprising an array of sound sensors positioned in an arbitrary configuration, a sound source localization unit, an adaptive beamforming unit, and a noise reduction unit, is provided. The sound source localization unit, the adaptive beamforming unit, and the noise reduction unit are in operative communication with the array of sound sensors. The array of sound sensors is, for example, a linear array of sound sensors, a circular array of sound sensors, or an arbitrarily distributed coplanar array of sound sensors. The array of sound sensors herein referred to as a "microphone array" receives sound signals from multiple disparate sound sources. The method disclosed herein can be applied on a microphone array with an arbitrary number of sound sensors having, for example, an arbitrary two dimensional (2D) configuration. The sound signals received by the sound sensors in the microphone array comprise the target sound signal from the target sound source among the disparate sound sources, and ambient noise signals.

The sound source localization unit estimates a spatial location of the target sound signal from the received sound signals, for example, using a steered response power-phase transform. The adaptive beamforming unit performs adaptive beamforming for steering a directivity pattern of the microphone array in a direction of the spatial location of the target sound signal. The adaptive beamforming unit thereby enhances the target sound signal from the target sound source and partially suppresses the ambient noise signals. The noise reduction unit suppresses the ambient noise signals for further enhancing the target sound signal received from the target sound source.

In an embodiment where the target sound source that emits the target sound signal is in a two dimensional plane, a delay between each of the sound sensors and an origin of the microphone array is determined as a function of distance between each of the sound sensors and the origin, a predefined angle between each of the sound sensors and a reference axis, and an azimuth angle between the reference axis and the target sound signal. In another embodiment where the target sound source that emits the target sound signal is in a three dimensional plane, the delay between each of the sound sensors and the origin of the microphone array is determined as a function of distance between each of the sound sensors and the origin, a predefined angle between each of the sound sensors and a first reference axis, an elevation angle between a second reference axis and the target sound signal, and an azimuth angle between the first reference axis and the target sound signal. This method of determining the delay enables beamforming for arbitrary numbers of sound sensors and multiple arbitrary microphone array configurations. The delay is determined, for example, in terms of number of samples. Once the delay is determined, the microphone array can be aligned to enhance the target sound signal from a specific direction.

The adaptive beamforming unit comprises a fixed beamformer, a blocking matrix, and an adaptive filter. The fixed beamformer steers the directivity pattern of the microphone array in the direction of the spatial location of the target sound signal from the target sound source for enhancing the target sound signal, when the target sound source is in motion. The blocking matrix feeds the ambient noise signals to the adaptive filter by blocking the target sound signal from the target sound source. The adaptive filter adaptively filters the ambient noise signals in response to detecting the presence or absence of the target sound signal in the sound signals received from the disparate sound sources. The fixed beamformer performs fixed beamforming, for example, by filtering and summing output sound signals from the sound sensors.

In an embodiment, the adaptive filtering comprises sub-band adaptive filtering. The adaptive filter comprises an analysis filter bank, an adaptive filter matrix, and a synthesis filter bank. The analysis filter bank splits the enhanced target sound signal from the fixed beamformer and the ambient noise signals from the blocking matrix into multiple frequency sub-bands. The adaptive filter matrix adaptively filters the ambient noise signals in each of the frequency sub-bands in response to detecting the presence or absence of the target sound signal in the sound signals received from the disparate sound sources. The synthesis filter bank synthesizes a full-band sound signal using the frequency sub-bands of the enhanced target sound signal. In an embodiment, the adaptive beamforming unit further comprises an adaptation control unit for detecting the presence of the target sound signal and adjusting a step size for the adaptive filtering in response to detecting the presence or the absence of the target sound signal in the sound signals received from the disparate sound sources.

The noise reduction unit suppresses the ambient noise signals for further enhancing the target sound signal from the target sound source. The noise reduction unit performs noise reduction, for example, by using a Wiener-filter based noise reduction algorithm, a spectral subtraction noise reduction algorithm, an auditory transform based noise reduction algorithm, or a model based noise reduction algorithm. The noise reduction unit performs noise reduction in multiple frequency sub-bands employed for sub-band adaptive beamforming by the analysis filter bank of the adaptive beamforming unit.

The microphone array system disclosed herein comprising the microphone array with an arbitrary number of sound sensors positioned in arbitrary configurations can be implemented in handheld devices, for example, the iPad® of Apple Inc., the iPhone® of Apple Inc., smart phones, tablet computers, laptop computers, etc. The microphone array system disclosed herein can further be implemented in conference phones, video conferencing applications, or any device or equipment that needs better speech inputs.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 6A exemplarily illustrates a table showing the distance between each sound sensor in a circular microphone array configuration from the origin of the microphone array, when the target sound source is in the same plane as that of the microphone array.

FIG. 6B exemplarily illustrates a table showing the relationship of the position of each sound sensor in the circular microphone array configuration and its distance to the origin of the microphone array, when the target sound source is in the same plane as that of the microphone array.

FIGS. 19A-19F exemplarily illustrate tables showing different microphone array configurations and the corresponding values of delay $\tau_n$, for the sound sensors in each of the microphone array configurations.

DETAILED DESCRIPTION OF THE INVENTION

Figure 1:
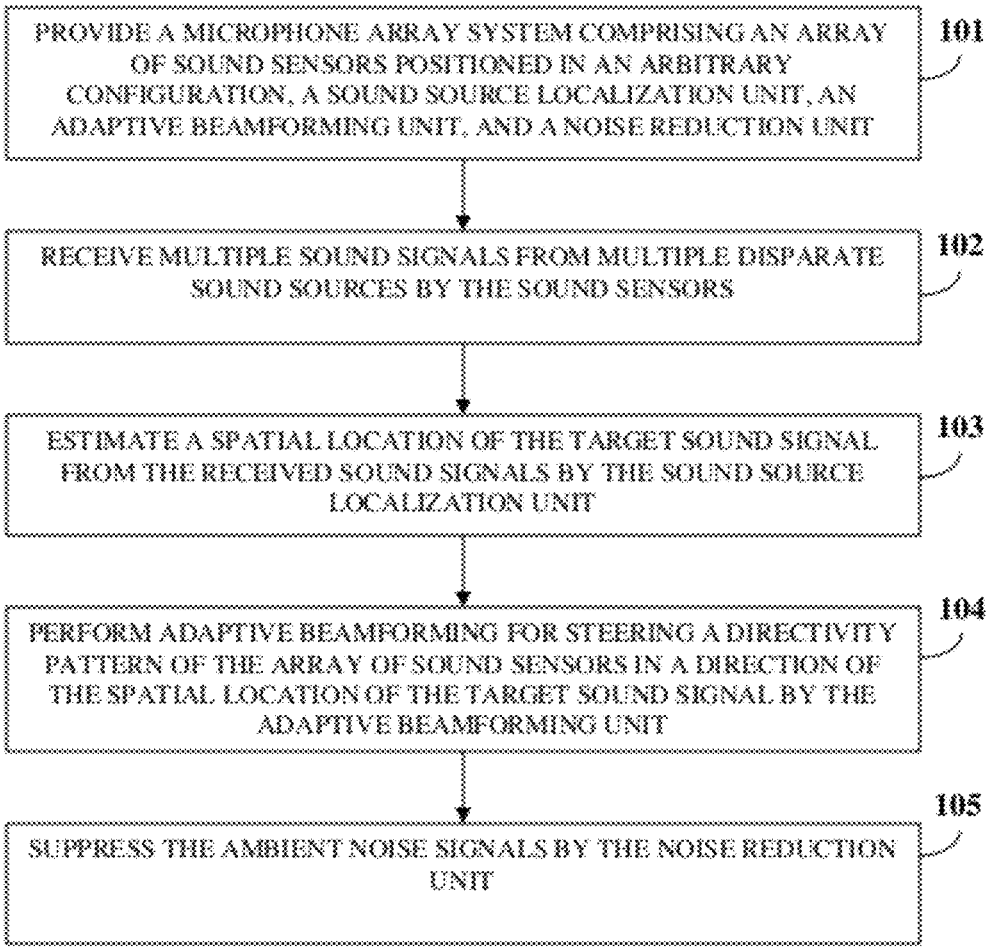
FIG. 1 illustrates a method for enhancing a target sound signal from multiple sound signals.

FIG. 1 illustrates a method for enhancing a target sound signal from multiple sound signals. As used herein, the term "target sound signal" refers to a desired sound signal from a desired or target sound source, for example, a person's speech that needs to be enhanced. The method disclosed herein provides 101 a microphone array system comprising an array of sound sensors positioned in an arbitrary configuration, a sound source localization unit, an adaptive beamforming unit, and a noise reduction unit. The sound source localization unit, the adaptive beamforming unit, and the noise reduction unit are in operative communication with the array of sound sensors. The microphone array system disclosed herein employs the array of sound sensors positioned in an arbitrary configuration, the sound source localization unit, the adaptive beamforming unit, and the noise reduction unit for enhancing a target sound signal by acoustic beam forming in the direction of the target sound signal in the presence of ambient noise signals.

The array of sound sensors herein referred to as a "microphone array" comprises multiple or an arbitrary number of sound sensors, for example, microphones, operating in tandem. The microphone array refers to an array of an arbitrary number of sound sensors positioned in an arbitrary configuration. The sound sensors are transducers that detect sound and convert the sound into electrical signals. The sound sensors are, for example, condenser microphones, piezoelectric microphones, etc.

The sound sensors receive 102 sound signals from multiple disparate sound sources and directions. The target sound source that emits the target sound signal is one of the disparate sound sources. As used herein, the term "sound signals" refers to composite sound energy from multiple disparate sound sources in an environment of the microphone array. The sound signals comprise the target sound signal from the target sound source and the ambient noise signals. The sound sensors are positioned in an arbitrary planar configuration herein referred to as a "microphone array configuration", for example, a linear configuration, a circular configuration, any arbitrarily distributed coplanar array configuration, etc. By employing beamforming according to the method disclosed herein, the microphone array provides a higher response to the target sound signal received from a particular direction than to the sound signals from other directions. A plot of the response of the microphone array versus frequency and direction of arrival of the sound signals is referred to as a directivity pattern of the microphone array.

The sound source localization unit estimates 103 a spatial location of the target sound signal from the received sound signals. In an embodiment, the sound source localization unit estimates the spatial location of the target sound signal from the target sound source, for example, using a steered response power-phase transform as disclosed in the detailed description of FIG. 8.

The adaptive beamforming unit performs adaptive beamforming 104 by steering the directivity pattern of the microphone array in a direction of the spatial location of the target sound signal, thereby enhancing the target sound signal, and partially suppressing the ambient noise signals. Beamforming refers to a signal processing technique used in the microphone array for directional signal reception, that is, spatial filtering. This spatial filtering is achieved by using adaptive or fixed methods. Spatial filtering refers to separating two signals with overlapping frequency content that originate from different spatial locations.

The noise reduction unit performs noise reduction by further suppressing 105 the ambient noise signals and thereby further enhancing the target sound signal. The noise reduction unit performs the noise reduction, for example, by using a Wiener-filter based noise reduction algorithm, a spectral subtraction noise reduction algorithm, an auditory transform based noise reduction algorithm, or a model based noise reduction algorithm.

Figure 2:
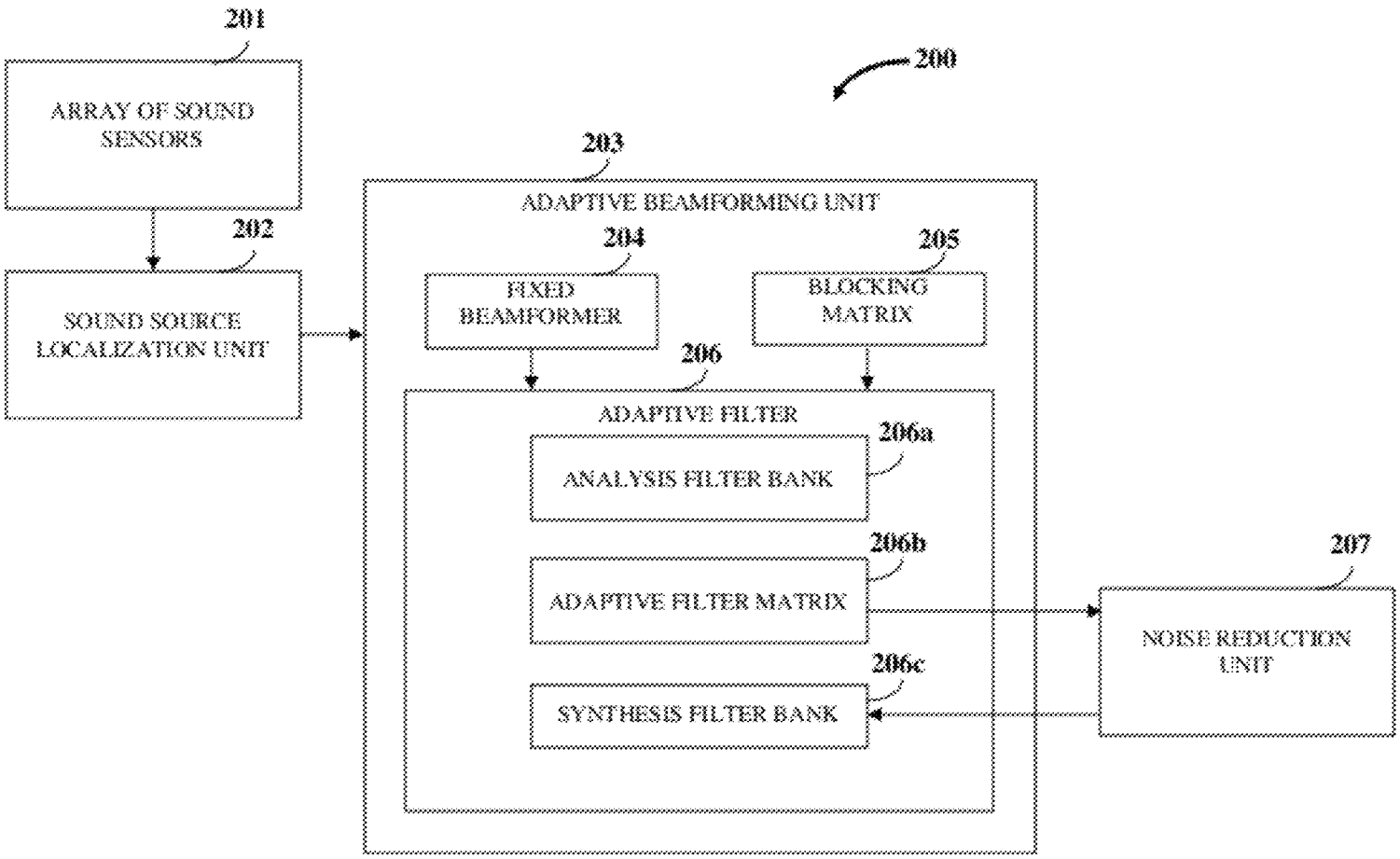
FIG. 2 illustrates a system for enhancing a target sound signal from multiple sound signals.

FIG. 2 illustrates a system 200 for enhancing a target sound signal from multiple sound signals. The system 200, herein referred to as a "microphone array system", comprises the array 201 of sound sensors positioned in an arbitrary configuration, the sound source localization unit 202, the adaptive beamforming unit 203, and the noise reduction unit 207.

The array 201 of sound sensors, herein referred to as the "microphone array" is in operative communication with the sound source localization unit 202, the adaptive beamforming unit 203, and the noise reduction unit 207. The microphone array 201 is, for example, a linear array of sound sensors, a circular array of sound sensors, or an arbitrarily distributed coplanar array of sound sensors. The microphone array 201 achieves directional gain in any preferred spatial direction and frequency band while suppressing signals from other spatial directions and frequency bands. The sound sensors receive the sound signals comprising the target sound signal and ambient noise signals from multiple disparate sound sources, where one of the disparate sound sources is the target sound source that emits the target sound signal.

The sound source localization unit 202 estimates the spatial location of the target sound signal from the received sound signals. In an embodiment, the sound source localization unit 202 uses, for example, a steered response power-phase transform, for estimating the spatial location of the target sound signal from the target sound source.

The adaptive beamforming unit 203 steers the directivity pattern of the microphone array 201 in a direction of the spatial location of the target sound signal, thereby enhancing the target sound signal and partially suppressing the ambient noise signals. The adaptive beamforming unit 203 comprises a fixed beamformer 204, a blocking matrix 205, and an adaptive filter 206 as disclosed in the detailed description of FIG. 10. The fixed beamformer 204 performs fixed beamforming by filtering and summing output sound signals from each of the sound sensors in the microphone array 201 as disclosed in the detailed description of FIG. 4. In an embodiment, the adaptive filter 206 is implemented as a set of sub-band adaptive filters. The adaptive filter 206 comprises an analysis filter bank 206a, an adaptive filter matrix 206b, and a synthesis filter bank 206c as disclosed in the detailed description of FIG. 11.

The noise reduction unit 207 further suppresses the ambient noise signals for further enhancing the target sound signal. The noise reduction unit 207 is, for example, a Wiener-filter based noise reduction unit, a spectral subtraction noise reduction unit, an auditory transform based noise reduction unit, or a model based noise reduction unit.

Figure 3:
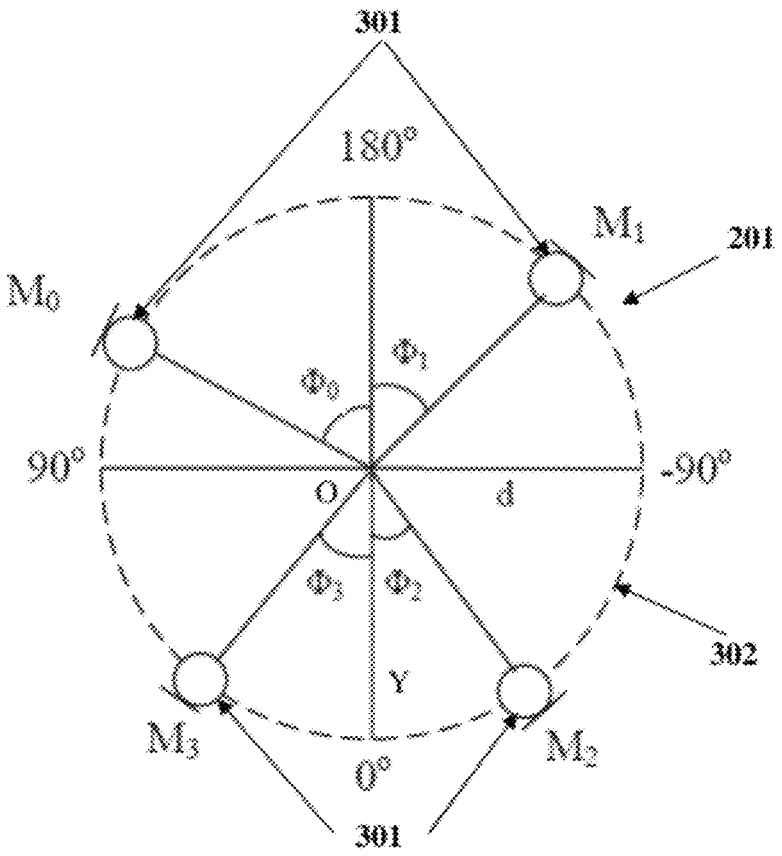
FIG. 3 exemplarily illustrates a microphone array configuration showing a microphone array having N sound sensors arbitrarily distributed on a circle.

FIG. 3 exemplarily illustrates a microphone array configuration showing a microphone array 201 having N sound sensors 301 arbitrarily distributed on a circle 302 with a diameter "d", where "N" refers to the number of sound sensors 301 in the microphone array 201. Consider an example where N=4, that is, there are four sound sensors 301 $M_0$, $M_1$, $M_2$, and $M_3$ in the microphone array 201. Each of the sound sensors 301 is positioned at an acute angle "$\Phi_n$" from a Y-axis, where $\Phi_1 \geq 0$ and n=0, 1, 2, . . . N−1. In an example, the sound sensor 301 $M_0$ is positioned at an acute angle $\Phi_0$ from the Y-axis; the sound sensor 301 $M_1$ is positioned at an acute angle $\Phi_1$ from the Y-axis; the sound sensor 301 $M_2$ is positioned at an acute angle $\Phi_2$ from the Y-axis; and the sound sensor 301 $M_3$ is positioned at an acute angle $\Phi_3$ from the Y-axis. A filter-and-sum beamforming algorithm determines the output "y" of the microphone array 201 having N sound sensors 301 as disclosed in the detailed description of FIG. 4.

Figure 4:
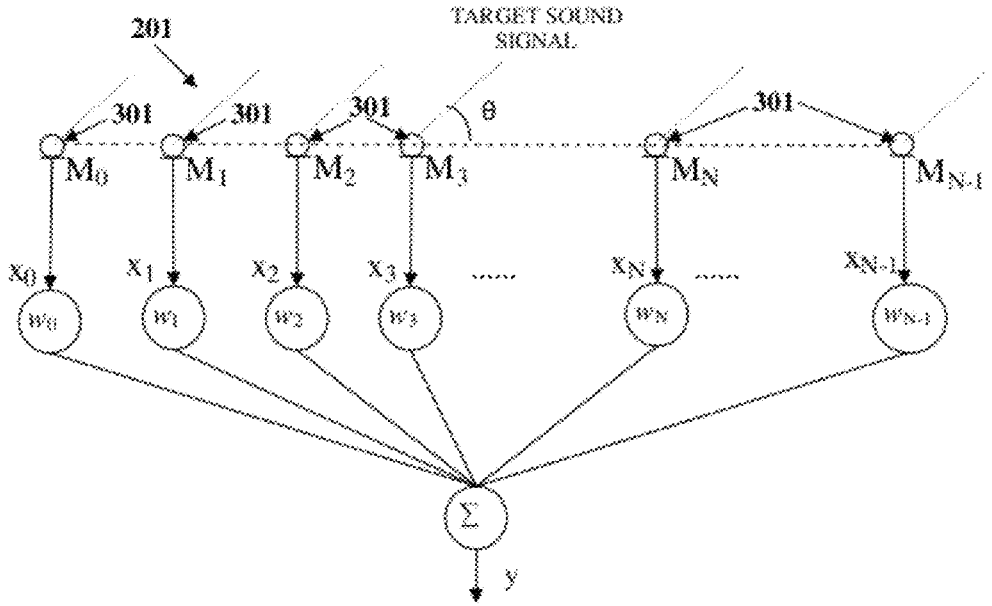
FIG. 4 exemplarily illustrates a graphical representation of a filter-and-sum beamforming algorithm for determining output of the microphone array having N sound sensors.

FIG. 4 exemplarily illustrates a graphical representation of the filter-and-sum beamforming algorithm for determining the output of the microphone array 201 having N sound sensors 301. Consider an example where the target sound signal from the target sound source is at an angle θ with a normalized frequency w. The microphone array configuration is arbitrary in a two dimensional plane, for example, a circular array configuration where the sound sensors 301 $M_0$, $M_1$, $M_2$, . . . , $M_N$, $M_{N-1}$ of the microphone array 201 are arbitrarily positioned on a circle 302. The sound signals received by each of the sound sensors 301 in the microphone array 201 are inputs to the microphone array 201. The adaptive beamforming unit 203 employs the filter-and-sum beamforming algorithm that applies independent weights to each of the inputs to the microphone array 201 such that directivity pattern of the microphone array 201 is steered to the spatial location of the target sound signal as determined by the sound source localization unit 202.

The output "y" of the microphone array 201 having N sound sensors 301 is the filter-and-sum of the outputs of the N sound sensors 301. That is, $y=\Sigma_{n=0}^{N-1} w_n^T x_n$, where $x_n$ is the output of the $(n+1)^{th}$ sound sensor 301, and $w_n^T$ denotes a transpose of a length-L filter applied to the $(n+1)^{th}$ sound sensor 301.

The spatial directivity pattern H (ω, θ) for the target sound signal from angle θ with normalized frequency w is defined as:

$$H(\omega, \theta) = \frac{Y(\omega, \theta)}{X(\omega, \theta)} = \frac{\sum_{n=0}^{N-1} W_n(\omega) X_n(\omega, \theta)}{X(\omega, \theta)} \tag{1}$$

where $\overline{X}$ is the signal received at the origin of the circular microphone array 201 and W is the frequency response of the real-valued finite impulse response (FIR) filter w. If the target sound source is far enough away from the microphone array 201, the difference between the signal received by the $(n+1)^{th}$ sound sensor 301 "$x_n$" and the origin of the microphone array 201 is a delay $\tau_n$; that is, $X_n(\omega,\tau)=\overline{X}(\omega, \theta)e^{-j\omega\tau_n}$.

Figure 5:
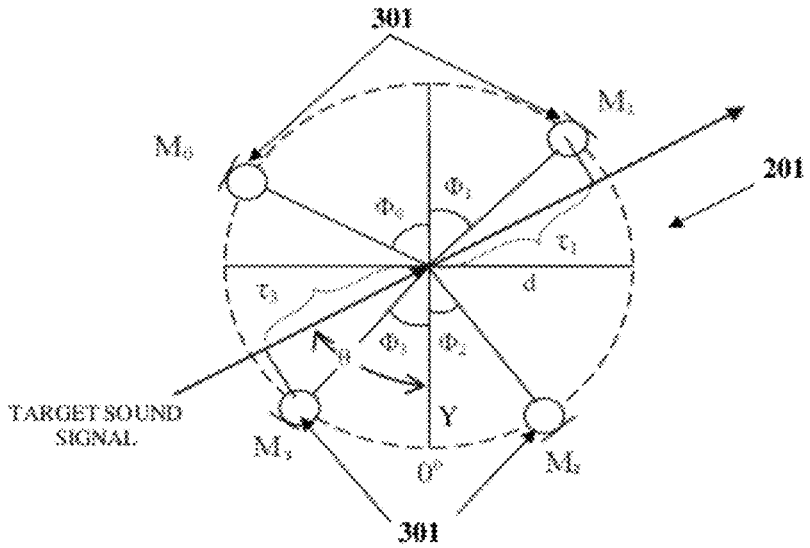
FIG. 5 exemplarily illustrates distances between an origin of the microphone array and sound sensor $M_1$ and sound sensor $M_3$ in the circular microphone array configuration, when the target sound signal is at an angle θ from the Y-axis.

FIG. 5 exemplarily illustrates distances between an origin of the microphone array 201 and the sound sensor 301 $M_1$ and the sound sensor 301 $M_3$ in the circular microphone array configuration, when the target sound signal is at an angle θ from the Y-axis. The microphone array system 200 disclosed herein can be used with an arbitrary directivity pattern for arbitrarily distributed sound sensors 301. For any specific microphone array configuration, the parameter that is defined to achieve beamformer coefficients is the value of delay $\tau_n$ for each sound sensor 301. To define the value of $\tau_n$, an origin or a reference point of the microphone array 201 is defined; and then the distance $d_n$ between each sound sensor 301 and the origin is measured, and then the angle $\Phi_n$ of each sound sensor 301 biased from a vertical axis is measured.

For example, the angle between the Y-axis and the line joining the origin and the sound sensor 301 $M_0$ is $\Phi_0$, the angle between the Y-axis and the line joining the origin and the sound sensor 301 $M_1$ is $\Phi_1$, the angle between the Y-axis and the line joining the origin and the sound sensor 301 $M_2$ is $\Phi_2$, and the angle between the Y-axis and the line joining the origin and the sound sensor 301 $M_3$ is $\Phi_3$. The distance between the origin O and the sound sensor 301 $M_1$, and the origin O and the sound sensor 301 $M_3$ when the incoming target sound signal from the target sound source is at an angle θ from the Y-axis is denoted as $\tau_1$ and $\tau_3$, respectively.

For purposes of illustration, the detailed description refers to a circular microphone array configuration; however, the scope of the microphone array system 200 disclosed herein is not limited to the circular microphone array configuration but may be extended to include a linear array configuration, an arbitrarily distributed coplanar array configuration, or a microphone array configuration with any arbitrary geometry.

FIG. 6A exemplarily illustrates a table showing the distance between each sound sensor 301 in a circular microphone array configuration from the origin of the microphone array 201, when the target sound source is in the same plane as that of the microphone array 201. The distance measured in meters and the corresponding delay (τ) measured in number of samples is exemplarily illustrated in FIG. 6A. In an embodiment where the target sound source that emits the target sound signal is in a two dimensional plane, the delay (τ) between each of the sound sensors 301 and the origin of the microphone array 201 is determined as a function of distance (d) between each of the sound sensors 301 and the origin, a predefined angle (Φ) between each of the sound sensors 301 and a reference axis (Y) as exemplarily illustrated in FIG. 5, and an azimuth angle (θ) between the reference axis (Y) and the target sound signal. The determined delay (τ) is represented in terms of number of samples.

If the target sound source is far enough from the microphone array 201, the time delay between the signal received by the $(n+1)^{th}$ sound sensor 301 "$x_n$," and the origin of the microphone array 201 is herein denoted as "t" measured in seconds. The sound signals received by the microphone array 201, which are in analog form are converted into digital sound signals by sampling the analog sound signals at a particular frequency, for example, 8000 Hz. That is, the number of samples in each second is 8000. The delay $\tau$ can be represented as the product of the sampling frequency ($f_s$) and the time delay (t). That is, $\tau=f_s*t$. Therefore, the distance between the sound sensors 301 in the microphone array 201 corresponds to the time used for the target sound signal to travel the distance and is measured by the number of samples within that time period.

Consider an example where "d" is the radius of the circle 302 of the circular microphone array configuration, "$f_s$" is the sampling frequency, and "c" is the speed of sound. FIG. 6B exemplarily illustrates a table showing the relationship of the position of each sound sensor 301 in the circular microphone array configuration and its distance to the origin of the microphone array 201, when the target sound source is in the same plane as that of the microphone array 201. The distance measured in meters and the corresponding delay ($\tau$) measured in number of samples is exemplarily illustrated in FIG. 6B.

The method of determining the delay ($\tau$) enables beamforming for arbitrary numbers of sound sensors 301 and multiple arbitrary microphone array configurations. Once the delay ($\tau$) is determined, the microphone array 201 can be aligned to enhance the target sound signal from a specific direction.

Therefore, the spatial directivity pattern H can be rewritten as:

$$H(\omega,\theta)=\Sigma_{n=0}^{N-1}W_n(\omega)e^{-j\omega\tau_n(\theta)}=w^T g(\omega,\theta) \tag{2}$$

where $w^T=[w_0^T, w_1^T, w_2^T, w_3^T, \ldots, w_{N-1}^T]$ and $g(\omega,\theta)=\{g^i(\omega,\theta)\}_{i=1\ldots NL}=\{e^{-j\omega(k+\tau_n(\theta))}\}_{i=1\ldots NL}$ is the steering vector, i=1 . . . NL, and k=mod(i−1,L) and n=floor ((i−1)/L).

Figures 7A, 7B:
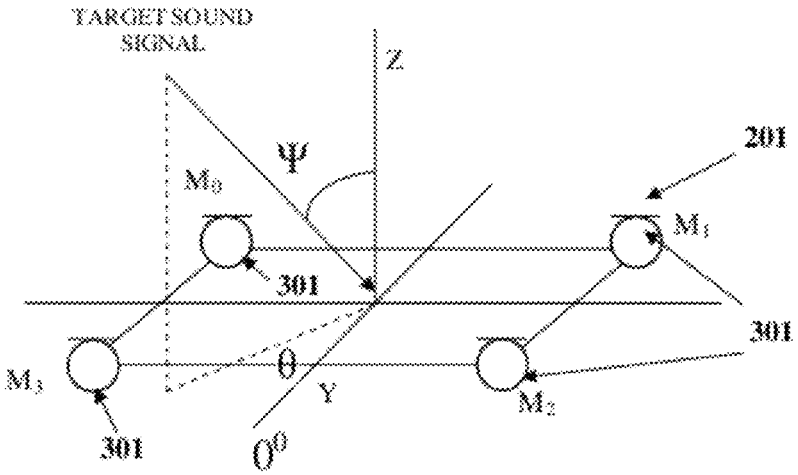
FIG. 7A exemplarily illustrates a graphical representation of a microphone array, when the target sound source is in a three dimensional plane.
FIG. 7B exemplarily illustrates a table showing delay between each sound sensor in a circular microphone array configuration and the origin of the microphone array, when the target sound source is in a three dimensional plane.
Figure 7C:
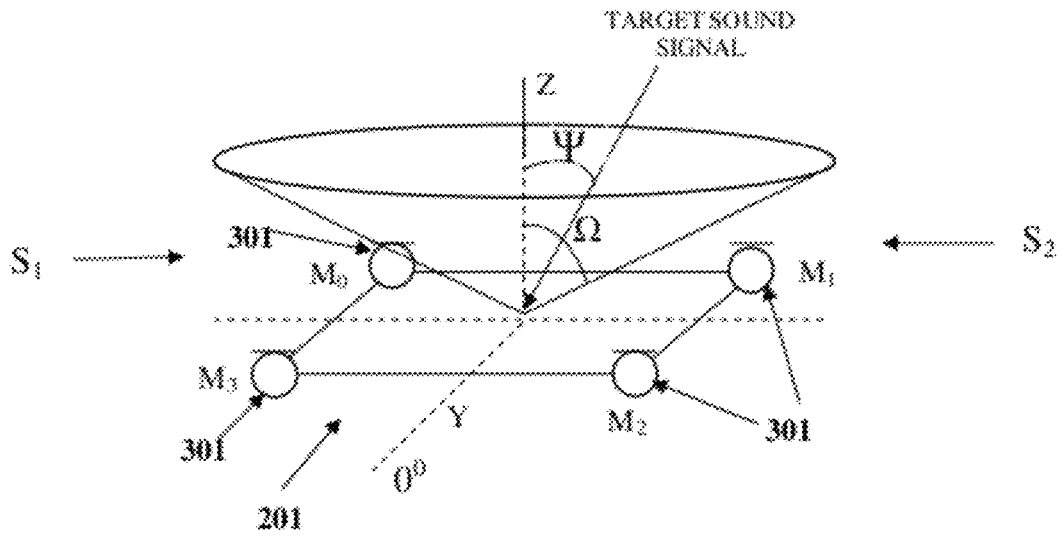
FIG. 7C exemplarily illustrates a three dimensional working space of the microphone array, where the target sound signal is incident at an elevation angle $\Psi<\Omega$ FIG. 8 exemplarily illustrates a method for estimating a spatial location of the target sound signal from the target sound source by a sound source localization unit using a steered response power-phase transform.

FIGS. 7A-7C exemplarily illustrate an embodiment of a microphone array 201 when the target sound source is in a three dimensional plane. In an embodiment where the target sound source that emits the target sound signal is in a three dimensional plane, the delay ($\tau$) between each of the sound sensors 301 and the origin of the microphone array 201 is determined as a function of distance (d) between each of the sound sensors 301 and the origin, a predefined angle ($\Phi$) between each of the sound sensors 301 and a first reference axis (Y), an elevation angle ($\Psi$) between a second reference axis (Z) and the target sound signal, and an azimuth angle ($\theta$) between the first reference axis (Y) and the target sound signal. The determined delay ($\tau$) is represented in terms of number of samples. The determination of the delay enables beamforming for arbitrary numbers of the sound sensors 301 and multiple arbitrary configurations of the microphone array 201.

Consider an example of a microphone array configuration with four sound sensors 301 $M_0$, $M_1$, $M_2$, and $M_3$. FIG. 7A exemplarily illustrates a graphical representation of a microphone array 201, when the target sound source in a three dimensional plane. As exemplarily illustrated in FIG. 7A, the target sound signal from the target sound source is received from the direction ($\Psi$, $\theta$) with reference to the origin of the microphone array 201, where $\Psi$ is the elevation angle and $\theta$ is the azimuth.

FIG. 7B exemplarily illustrates a table showing delay between each sound sensor 301 in a circular microphone array configuration and the origin of the microphone array 201, when the target sound source is in a three dimensional plane. The target sound source in a three dimensional plane emits a target sound signal from a spatial location ($\Psi$, $\theta$). The distances between the origin O and the sound sensors 301 $M_0$, $M_1$, $M_2$, and $M_3$ when the incoming target sound signal from the target sound source is at an angle ($\Psi$, $\theta$) from the Z-axis and the Y-axis respectively, are denoted as $\tau_0$, $\tau_1$, $\tau_2$, and $\tau_3$ respectively. When the spatial location of the target sound signal moves from the location $\Psi=90°$ to a location $\Psi=0°$, sin($\Psi$) changes from 1 to 0, and as a result, the difference between each sound sensor 301 in the microphone array 201 becomes smaller and smaller. When $\Psi=0°$, there is no difference between the sound sensors 301, which implies that the target sound signal reaches each sound sensor 301 at the same time. Taking into account that the sample delay between the sound sensors 301 can only be an integer, the range where all the sound sensors 301 are identical is determined.

FIG. 7C exemplarily illustrates a three dimensional working space of the microphone array 201, where the target sound signal is incident at an elevation angle $\Psi<\Omega$, where $\Omega$ is a specific angle and is a variable representing the elevation angle. When the target sound signal is incident at an elevation angle $\Psi<\Omega$, all four sound sensors 301 $M_0$, $M_1$, $M_2$, and $M_3$ receive the same target sound signal for $0°<0<360°$. The delay $\tau$ is a function of both the elevation angle $\Psi$ and the azimuth angle $\theta$. That is, $\tau=\tau(\theta, \Psi)$. As used herein, $\Omega$ refers to the elevation angle such that all $\tau_i$ ($\theta$, $\Omega$) are equal to each other, where i=0, 1, 2, 3, etc. The value of $\Omega$ is determined by the sample delay between each of the sound sensors 301 and the origin of the microphone array 201. The adaptive beamforming unit 203 enhances sound from this range and suppresses sound signals from other directions, for example, $S_1$ and $S_2$ treating them as ambient noise signals.

Consider a least mean square solution for beamforming according to the method disclosed herein. Let the spatial directivity pattern be 1 in the passband and 0 in the stopband. The least square cost function is defined as:

$$\begin{aligned} J(w) &= \int_{\Omega_p}\int_{\Theta_p} |H(\omega,\theta)-1|^2\, d\omega d\theta + \alpha\int_{\Omega_s}\int_{\Theta_s} |H(\omega,\theta)|^2\, d\omega d\theta \\ &= \int_{\Omega_p}\int_{\Theta_p} |H(\omega,\theta)|^2\, d\omega d\theta + \alpha\int_{\Omega_S}\int_{\Theta_X} |H(\omega,\theta)|^2\, d\omega d\theta - \\ &\quad 2\int_{\Omega_P}\int_{\Theta_P} \mathrm{Re}(H(\omega,\theta))\, d\omega d\theta + \int_{\Omega_P}\int_{\Theta_P} 1 d\omega d\theta \end{aligned} \tag{3}$$

Replacing $|H(\omega,\theta)|^2=w^T g(\omega,\theta)g^H(\omega,\theta)w=w^T(G_R(\omega,\theta)+jG_1(\omega,\theta))$ $w=w^T G_R(\omega,\theta)w$ and $\mathrm{Re}(H(\omega,\theta))=w^T g_R(\omega,\theta)$, J ($\omega$) becomes $$J(\omega)=w^T Qw-2w^T\alpha+d, \text{ where}$$

$$Q=\int_{\Omega_P}\int_{\Theta_P} G_R(\omega,\theta)d\omega d\theta+\alpha\theta_{\Omega_S}\int_{\Theta_S} G_R(\omega,\theta)d\omega d\theta$$

$$\alpha=\int_{\Omega_P}\int_{\Theta_P} g_R(\omega,\theta)d\omega d\theta$$

$$d=\int_{\Omega_P}\int_{\Theta_P} 1 d\omega d\theta \tag{4}$$

where $g_R(\omega,\theta)=\cos[\omega(k+\tau_n)]$ and $G_R(\omega,\theta)=\cos[\omega(k-l+\tau_n-\tau_m)]$.

When $\partial J/\partial w=0$, the cost function J is minimized. The least-square estimate of w is obtained by:

$$w=Q^{-1}\alpha \tag{5}$$

Applying linear constrains Cw=b, the spatial response is further constrained to a predefined value b at angle $\theta_f$ using following equation:

$$\begin{bmatrix} g_R^T(\omega_{start}, \theta_f) \\ \dots \\ g_R^T(\omega_{end}, \theta_f) \end{bmatrix} w = \begin{bmatrix} b_{start} \\ \dots \\ b_{end} \end{bmatrix} \tag{6}$$

Now, the design problem becomes:

$$\min_w w^T Q w - 2w^T a + d \text{ subject to } Cw = b \tag{7}$$

and the solution of the constrained minimization problem is equal to:

$$w = Q^{-1}C^T(CQ^{-1}C^T)^{-1}(b - CQ^{-1}\alpha) + Q^{-1}\alpha \tag{8}$$

where w is the filter parameter for the designed adaptive beamforming unit 203.

In an embodiment, the beamforming is performed by a delay-sum method. In another embodiment, the beamforming is performed by a filter-sum method.

Figure 8:
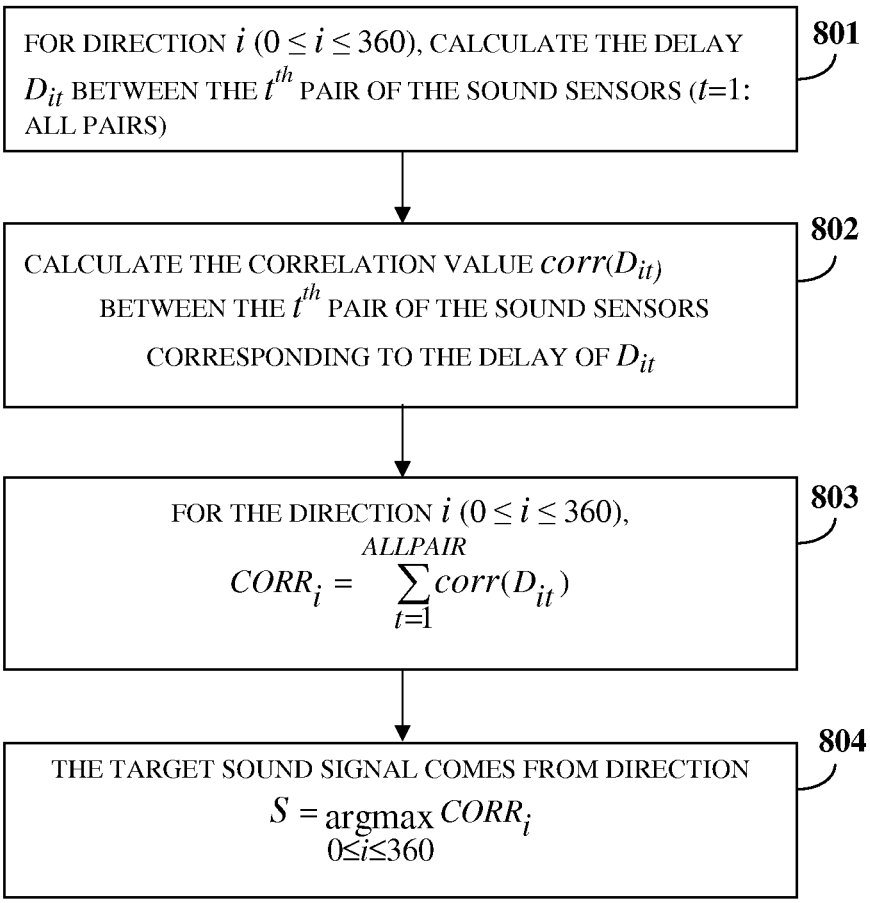

FIG. 8 exemplarily illustrates a method for estimating a spatial location of the target sound signal from the target sound source by the sound source localization unit 202 using a steered response power-phase transform (SRP-PHAT). The SRP-PHAT combines the advantages of sound source localization methods, for example, the time difference of arrival (TDOA) method and the steered response power (SRP) method. The TDOA method performs the time delay estimation of the sound signals relative to a pair of spatially separated sound sensors 301. The estimated time delay is a function of both the location of the target sound source and the position of each of the sound sensors 301 in the microphone array 201. Because the position of each of the sound sensors 301 in the microphone array 201 is predefined, once the time delay is estimated, the location of the target sound source can be determined. In the SRP method, a filter-and-sum beamforming algorithm is applied to the microphone array 201 for sound signals in the direction of each of the disparate sound sources. The location of the target sound source corresponds to the direction in which the output of the filter-and-sum beamforming has the largest response power. The TDOA based localization is suitable under low to moderate reverberation conditions. The SRP method requires shorter analysis intervals and exhibits an elevated insensitivity to environmental conditions while not allowing for use under excessive multi-path. The SRP-PHAT method disclosed herein combines the advantages of the TDOA method and the SRP method, has a decreased sensitivity to noise and reverberations compared to the TDOA method, and provides more precise location estimates than existing localization methods.

For direction i ($0 \le t \le 360$), the delay $D_{it}$ is calculated 801 between the $t^{th}$ pair of the sound sensors 301 (t=1: all pairs). The correlation value $\text{corr}(D_{it})$ between the $t^{th}$ pair of the sound sensors 301 corresponding to the delay of $D_{it}$ is then calculated 802. For the direction i ($0 \le i \le 360$), the correlation value is given 803 by:

$$\text{CORR}_i = \sum_{t=1}^{ALL\,PAIR} \text{corr}(D_{it})$$

Therefore, the spatial location of the target sound signal is given 804 by:

$$S = \underset{0 \le i \le 360}{\text{argmax}} \text{CORR}_i.$$

Figure 9A:
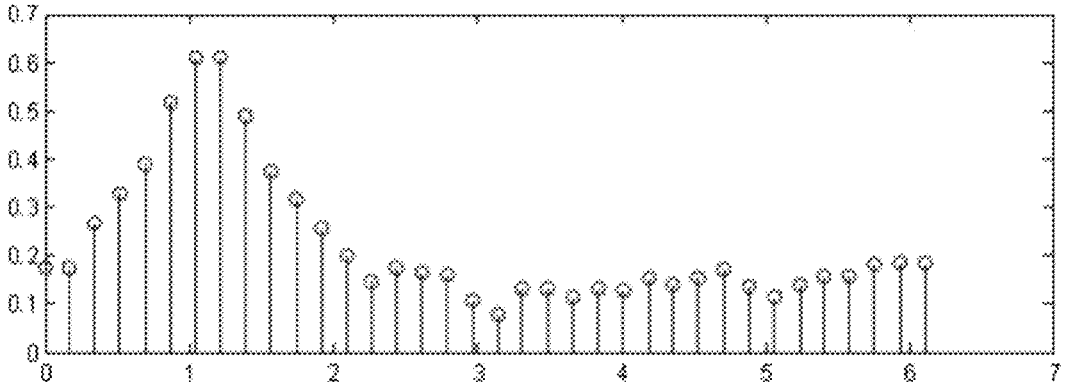
FIG. 9A exemplarily illustrates a graph showing the value of the steered response power-phase transform for every 10°.
Figure 9B:
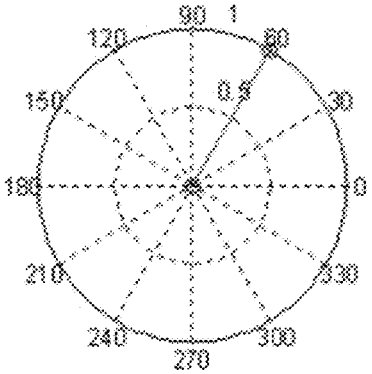
FIG. 9B exemplarily illustrates a graph representing the estimated target sound signal from the target sound source.

FIGS. 9A-9B exemplarily illustrate graphs showing the results of sound source localization performed using the steered response power-phase transform (SRP-PHAT). FIG. 9A exemplarily illustrates a graph showing the value of the SRP-PHAT for every 10° The maximum value corresponds to the location of the target sound signal from the target sound source. FIG. 9B exemplarily illustrates a graph representing the estimated target sound signal from the target sound source and a ground truth.

Figure 10:
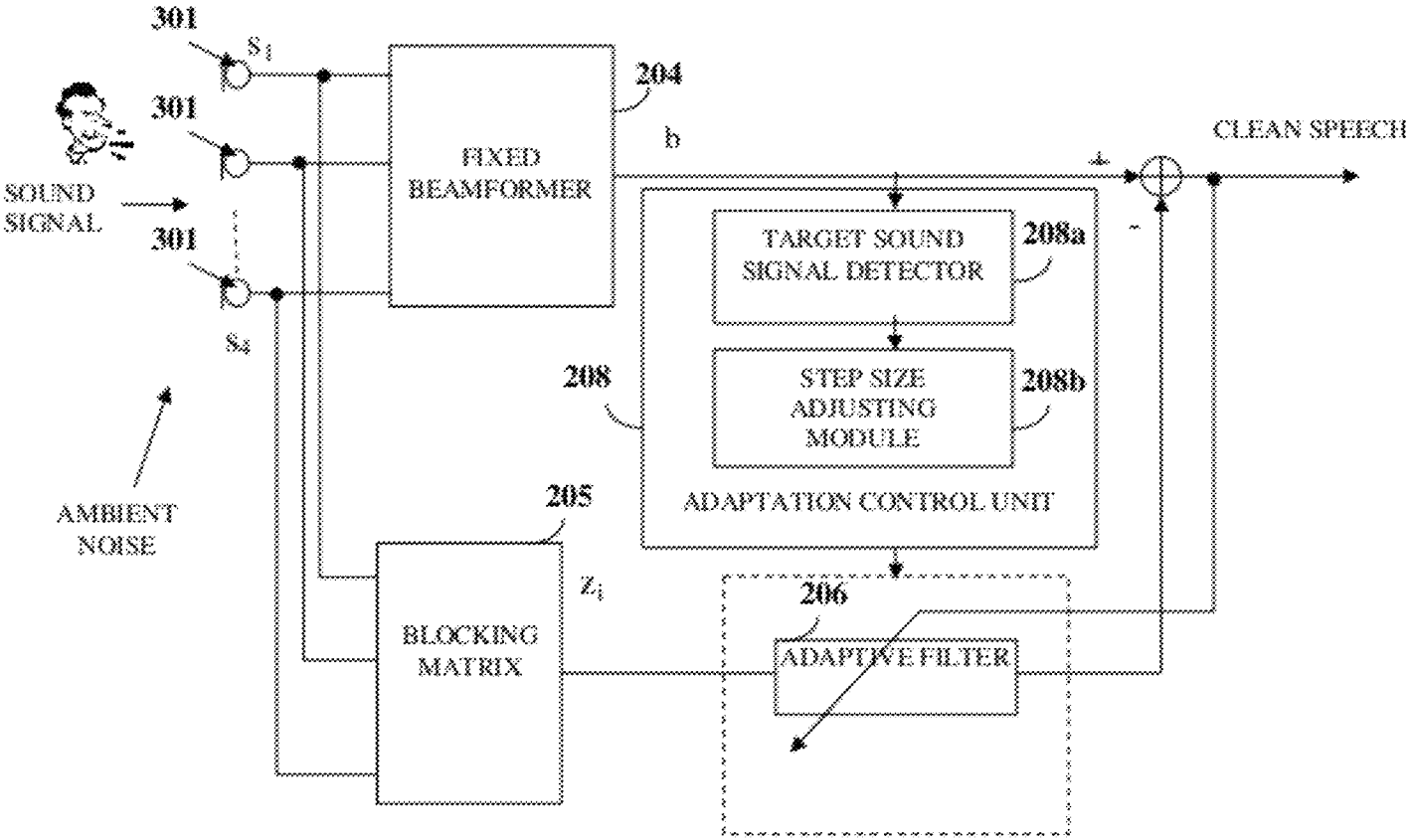
FIG. 10 exemplarily illustrates a system for performing adaptive beamforming by an adaptive beamforming unit.

FIG. 10 exemplarily illustrates a system for performing adaptive beamforming by the adaptive beamforming unit 203. The algorithm for fixed beamforming is disclosed with reference to equations (3) through (8) in the detailed description of FIG. 4, FIGS. 6A-6B, and FIGS. 7A-7C, which is extended herein to adaptive beamforming. Adaptive beamforming refers to a beamforming process where the directivity pattern of the microphone array 201 is adaptively steered in the direction of a target sound signal emitted by a target sound source in motion. Adaptive beamforming achieves better ambient noise suppression than fixed beamforming. This is because the target direction of arrival, which is assumed to be stable in fixed beamforming, changes with the movement of the target sound source. Moreover, the gains of the sound sensors 301 which are assumed uniform in fixed beamforming, exhibit significant distribution. All these factors reduce speech quality. On the other hand, adaptive beamforming adaptively performs beam steering and null steering; therefore, the adaptive beamforming method is more robust against steering error caused by the array imperfection mentioned above.

As exemplarily illustrated in FIG. 10, the adaptive beamforming unit 203 disclosed herein comprises a fixed beamformer 204, a blocking matrix 205, an adaptation control unit 208, and an adaptive filter 206. The fixed beamformer 204 adaptively steers the directivity pattern of the microphone array 201 in the direction of the spatial location of the target sound signal from the target sound source for enhancing the target sound signal, when the target sound source is in motion. The sound sensors 301 in the microphone array 201 receive the sound signals $S_1, \dots, S_4$, which comprise both the target sound signal from the target sound source and the ambient noise signals. The received sound signals are fed as input to the fixed beamformer 204 and the blocking matrix 205. The fixed beamformer 204 outputs a signal "b". In an embodiment, the fixed beamformer 204 performs fixed beamforming by filtering and summing output sound signals from the sound sensors 301. The blocking matrix 205 outputs a signal "z" which primarily comprises the ambient noise signals. The blocking matrix 205 blocks the target sound signal from the target sound source and feeds the ambient noise signals to the adaptive filter 206 to minimize the effect of the ambient noise signals on the enhanced target sound signal.

The output "z" of the blocking matrix 205 may contain some weak target sound signals due to signal leakage. If the adaptation is active when the target sound signal, for example, speech is present, the speech is cancelled out with the noise. Therefore, the adaptation control unit 208 determines when the adaptation should be applied. The adaptation control unit 208 comprises a target sound signal detector 208a and a step size adjusting module 208b. The target sound signal detector 208a of the adaptation control unit 208 detects the presence or absence of the target sound signal, for example, speech. The step size adjusting module 208b adjusts the step size for the adaptation process such that when the target sound signal is present, the adaptation is slow for preserving the target sound signal, and when the target sound signal is absent, adaptation is quick for better cancellation of the ambient noise signals.

The adaptive filter 206 is a filter that adaptively updates filter coefficients of the adaptive filter 206 so that the adaptive filter 206 can be operated in an unknown and changing environment. The adaptive filter 206 adaptively filters the ambient noise signals in response to detecting presence or absence of the target sound signal in the sound signals received from the disparate sound sources. The adaptive filter 206 adapts its filter coefficients with the changes in the ambient noise signals, thereby eliminating distortion in the target sound signal, when the target sound source and the ambient noise signals are in motion. In an embodiment, the adaptive filtering is performed by a set of sub-band adaptive filters using sub-band adaptive filtering as disclosed in the detailed description of FIG. 11.

Figure 11:
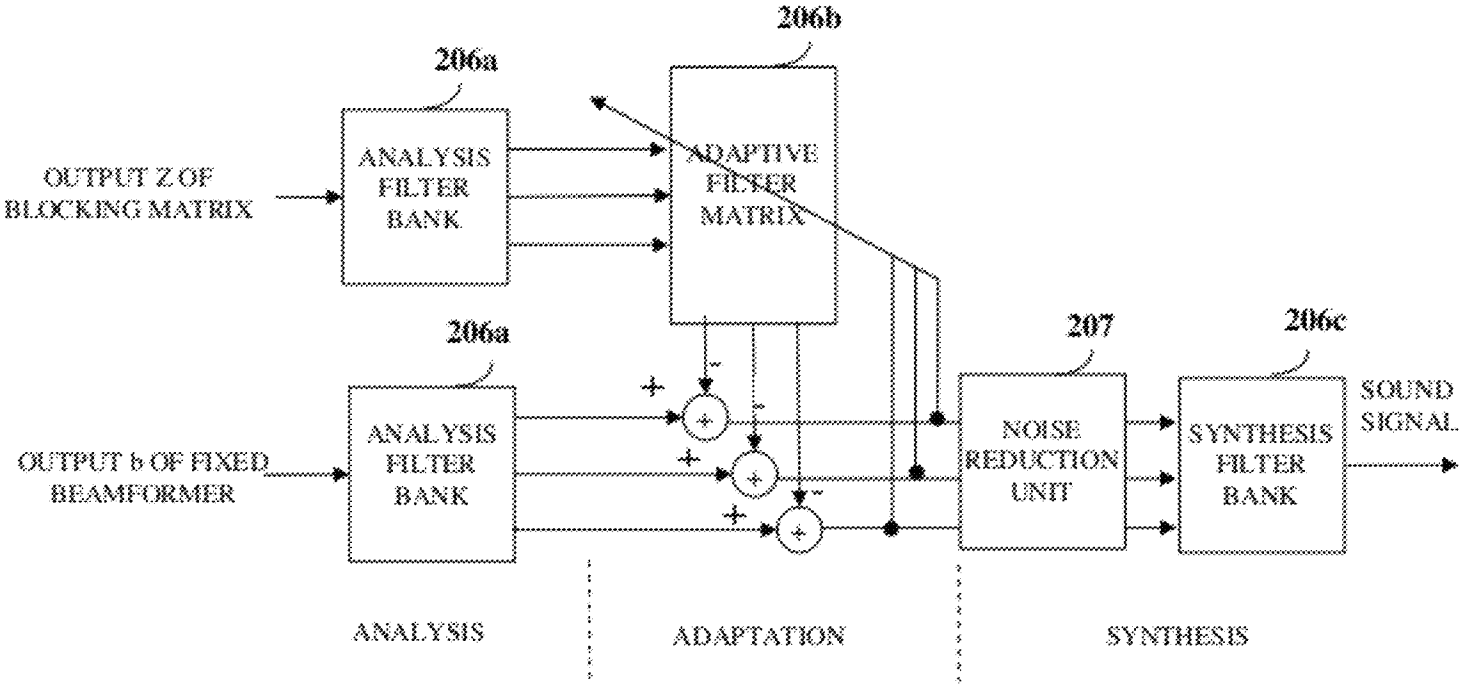
FIG. 11 exemplarily illustrates a system for sub-band adaptive filtering.

FIG. 11 exemplarily illustrates a system for sub-band adaptive filtering. Sub-band adaptive filtering involves separating a full-band signal into different frequency ranges called sub-bands prior to the filtering process. The sub-band adaptive filtering using sub-band adaptive filters lead to a higher convergence speed compared to using a full-band adaptive filter. Moreover, the noise reduction unit 207 disclosed herein is developed in a sub-band, whereby applying sub-band adaptive filtering provides the same sub-band framework for both beamforming and noise reduction, and thus saves on computational cost.

As exemplarily illustrated in FIG. 11, the adaptive filter 206 comprises an analysis filter bank 206a, an adaptive filter matrix 206b, and a synthesis filter bank 206c. The analysis filter bank 206a splits the enhanced target sound signal (b) from the fixed beamformer 204 and the ambient noise signals (z) from the blocking matrix 205 exemplarily illustrated in FIG. 10 into multiple frequency sub-bands. The analysis filter bank 206a performs an analysis step where the outputs of the fixed beamformer 204 and the blocking matrix 205 are split into frequency sub bands. The sub-band adaptive filter 206 typically has a shorter impulse response than its full band counterpart. The step size of the sub-bands can be adjusted individually for each sub-band by the step-size adjusting module 208b, which leads to a higher convergence speed compared to using a full band adaptive filter.

The adaptive filter matrix 206b adaptively filters the ambient noise signals in each of the frequency sub-bands in response to detecting the presence or absence of the target sound signal in the sound signals received from the disparate sound sources. The adaptive filter matrix 206b performs an adaptation step, where the adaptive filter 206 is adapted such that the filter output only contains the target sound signal, for example, speech. The synthesis filter bank 206c synthesizes a full-band sound signal using the frequency sub-bands of the enhanced target sound signal. The synthesis filter bank 206c performs a synthesis step where the sub-band sound signal is synthesized into a full-band sound signal. Since the noise reduction and the beamforming are performed in the same sub-band framework, the noise reduction as disclosed in the detailed description of FIG. 13, by the noise reduction unit 207 is performed prior to the synthesis step, thereby reducing computation.

In an embodiment, the analysis filter bank 206a is implemented as a perfect-reconstruction filter bank, where the output of the synthesis filter bank 206c after the analysis and synthesis steps perfectly matches the input to the analysis filter bank 206a. That is, all the sub-band analysis filter banks 206a are factorized to operate on prototype filter coefficients and a modulation matrix is used to take advantage of the fast Fourier transform (FFT). Both analysis and synthesize steps require performing frequency shifts in each sub-band, which involves complex value computations with cosines and sinusoids. The method disclosed herein employs the FFT to perform the frequency shifts required in each sub-band, thereby minimizing the amount of multiply-accumulate operations. The implementation of the sub-band analysis filter bank 206a as a perfect-reconstruction filter bank ensures the quality of the target sound signal by ensuring that the sub-band analysis filter banks 206a do not distort the target sound signal itself.

Figure 12:
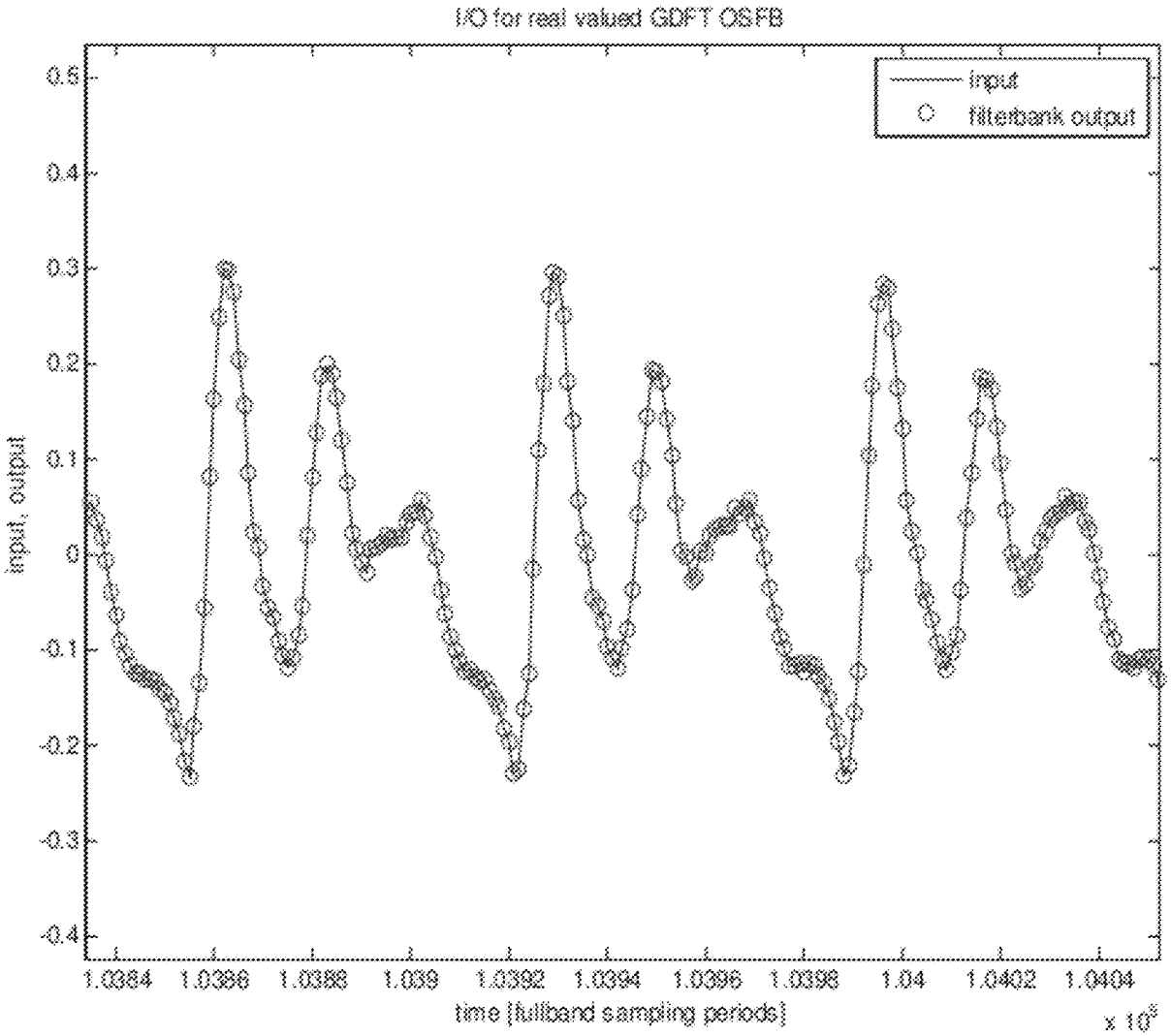
FIG. 12 exemplarily illustrates a graphical representation showing the performance of a perfect reconstruction filter bank.

FIG. 12 exemplarily illustrates a graphical representation showing the performance of a perfect-reconstruction filter bank. The solid line represents the input signal to the analysis filter bank 206a, and the circles represent the output of the synthesis filter bank 206c after analysis and synthesis. As exemplarily illustrated in FIG. 12, the output of the synthesis filter bank 206c perfectly matches the input, and is therefore referred to as the perfect-reconstruction filter bank.

Figure 13:
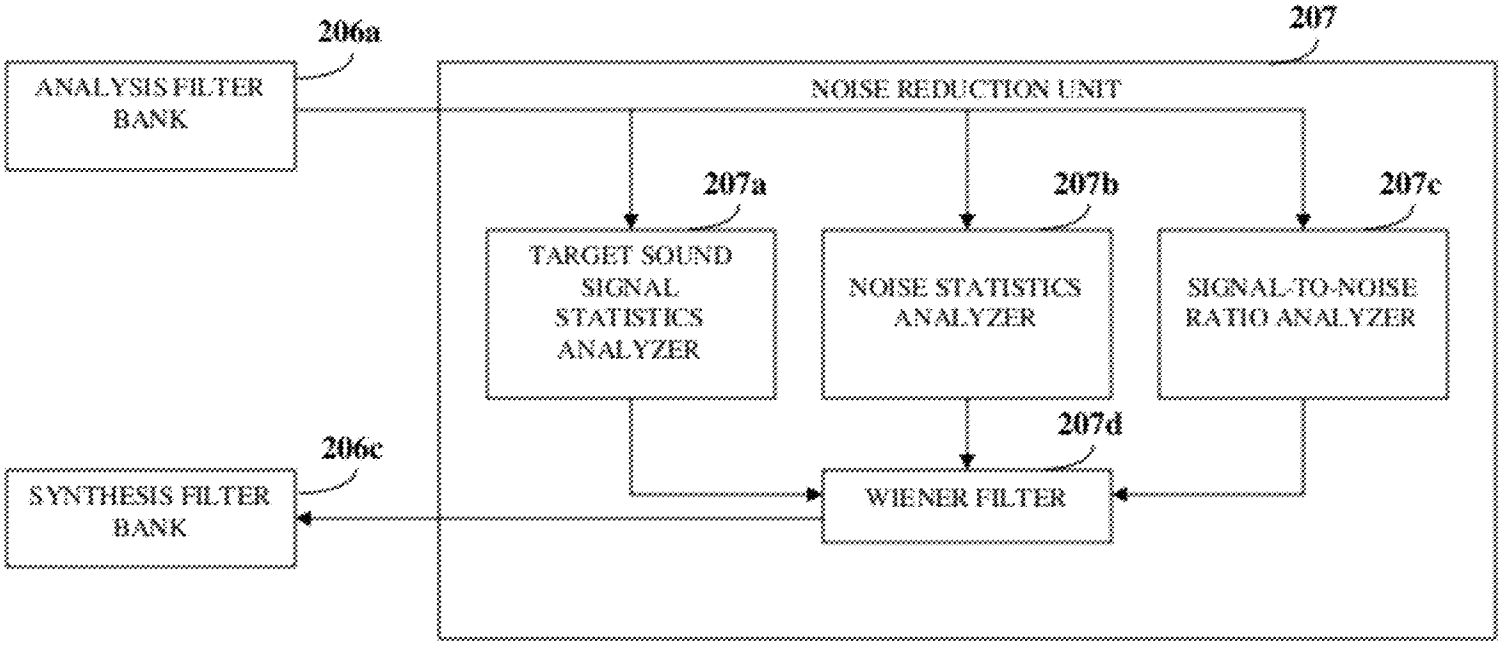
FIG. 13 exemplarily illustrates a block diagram of a noise reduction unit that performs noise reduction using a Wiener-filter based noise reduction algorithm.

FIG. 13 exemplarily illustrates a block diagram of a noise reduction unit 207 for performing noise reduction using, for example, a Wiener-filter based noise reduction algorithm. The noise reduction unit 207 performs noise reduction for further suppressing the ambient noise signals after adaptive beamforming, for example, by using a Wiener-filter based noise reduction algorithm, a spectral subtraction noise reduction algorithm, an auditory transform based noise reduction algorithm, or a model based noise reduction algorithm. In an embodiment, the noise reduction unit 207 performs noise reduction in multiple frequency sub-bands employed by an analysis filter bank 206a of the adaptive beamforming unit 203 for sub-band adaptive beamforming.

In an embodiment, the noise reduction is performed using the Wiener-filter based noise reduction algorithm. The noise reduction unit 207 explores the short-term and long-term statistics of the target sound signal, for example, speech, and the ambient noise signals, and the wide-band and narrow-band signal-to-noise ratio (SNR) to support a Wiener gain filtering. The noise reduction unit 207 comprises a target sound signal statistics analyzer 207a, a noise statistics analyzer 207b, a signal-to-noise ratio (SNR) analyzer 207c, and a Wiener filter 207d. The target sound signal statistics analyzer 207a explores the short-term and long-term statistics of the target sound signal, for example, speech. Similarly, the noise statistics analyzer 207b explores the short-term and long-term statistics of the ambient noise signals. The SNR analyzer 207c of the noise reduction unit 207 explores the wide-band and narrow-band signal-to-noise ratio (SNR). After the spectrum of noisy-speech passes through the Wiener filter 207d, an estimation of the clean-speech spectrum is generated. The synthesis filter bank 206c, by an inverse process of the analysis filter bank 206a, reconstructs the signals of the clean speech into a full-band signal, given the estimated spectrum of the clean speech.

Figure 14:
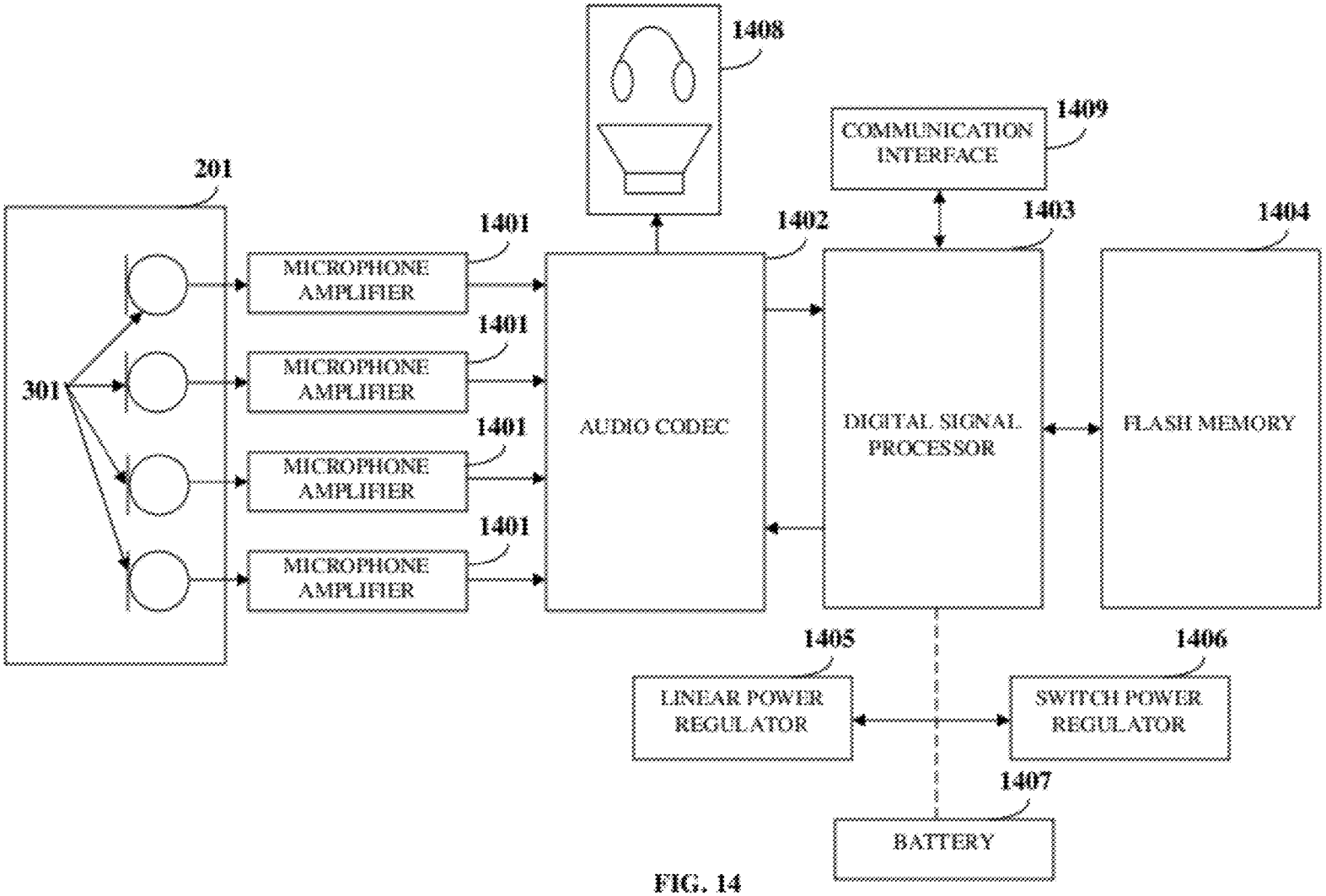
FIG. 14 exemplarily illustrates a hardware implementation of the microphone array system.

FIG. 14 exemplarily illustrates a hardware implementation of the microphone array system 200 disclosed herein. The hardware implementation of the microphone array system 200 disclosed in the detailed description of FIG. 2 comprises the microphone array 201 having an arbitrary number of sound sensors 301 positioned in an arbitrary configuration, multiple microphone amplifiers 1401, one or more audio codecs 1402, a digital signal processor (DSP) 1403, a flash memory 1404, one or more power regulators 1405 and 1406, a battery 1407, a loudspeaker or a headphone 1408, and a communication interface 1409. The microphone array 201 comprises, for example, four or eight sound sensors 301 arranged in a linear or a circular microphone array configuration. The microphone array 201 receives the sound signals.

Consider an example where the microphone array 201 comprises four sound sensors 301 that pick up the sound signals. Four microphone amplifiers 1401 receive the output sound signals from the four sound sensors 301. The microphone amplifiers 1401 also referred to as preamplifiers provide a gain to boost the power of the received sound signals for enhancing the sensitivity of the sound sensors 301. In an example, the gain of the preamplifiers is 20 dB.

The audio codec 1402 receives the amplified output from the microphone amplifiers 1401. The audio codec 1402 provides an adjustable gain level, for example, from about −74 dB to about 6 dB. The received sound signals are in an analog form. The audio codec 1402 converts the four channels of the sound signals in the analog form into digital sound signals. The pre-amplifiers may not be required for some applications. The audio codec 1402 then transmits the digital sound signals to the DSP 1403 for processing of the digital sound signals. The DSP 1403 implements the sound source localization unit 202, the adaptive beamforming unit 203, and the noise reduction unit 207.

After the processing, the DSP 1403 either stores the processed signal from the DSP 1403 in a memory device for a recording application, or transmits the processed signal to the communication interface 1409. The recording application comprises, for example, storing the processed signal onto the memory device for the purposes of playing back the processed signal at a later time. The communication interface 1409 transmits the processed signal, for example, to a computer, the internet, or a radio for communicating the processed signal. In an embodiment, the microphone array system 200 disclosed herein implements a two-way communication device where the signal received from the communication interface 1409 is processed by the DSP 1403 and the processed signal is then played through the loudspeaker or the headphone 1408.

The flash memory 1404 stores the code for the DSP 1403 and compressed audio signals. When the microphone array system 200 boots up, the DSP 1403 reads the code from the flash memory 1404 into an internal memory of the DSP 1403 and then starts executing the code. In an embodiment, the audio codec 1402 can be configured for encoding and decoding audio or sound signals during the start up stage by writing to registers of the DSP 1403. For an eight-sensor microphone array 201, two four-channel audio codec 1402 chips may be used. The power regulators 1405 and 1406, for example, linear power regulators 1405 and switch power regulators 1406 provide appropriate voltage and current supply for all the components, for example, 201, 1401, 1402, 1403, etc., mechanically supported and electrically connected on a circuit board. A universal serial bus (USB) control is built into the DSP 1403. The battery 1407 is used for powering the microphone array system 200.

Consider an example where the microphone array system 200 disclosed herein is implemented on a mixed signal circuit board having a six-layer printed circuit board (PCB). Noisy digital signals easily contaminate the low voltage analog sound signals from the sound sensors 301. Therefore, the layout of the mixed signal circuit board is carefully partitioned to isolate the analog circuits from the digital circuits. Although both the inputs and outputs of the microphone amplifiers 1401 are in analog form, the microphone amplifiers 1401 are placed in a digital region of the mixed signal circuit board because of their high power consumption 1401 and switch amplifier nature.

The linear power regulators 1405 are deployed in an analog region of the mixed signal circuit board due to the low noise property exhibited by the linear power regulators 1405. Five power regulators, for example, 1405 are designed in the microphone array system 200 circuits to ensure quality. The switch power regulators 1406 achieve an efficiency of about 95% of the input power and have high output current capacity; however their outputs are too noisy for analog circuits. The efficiency of the linear power regulators 1405 is determined by the ratio of the output voltage to the input voltage, which is lower than that of the switch power regulators 1406 in most cases. The regulator outputs utilized in the microphone array system 200 circuits are stable, quiet, and suitable for the low power analog circuits.

In an example, the microphone array system 200 is designed with a microphone array 201 having dimensions of 10 cm×2.5 cm×1.5 cm, a USB interface, and an assembled PCB supporting the microphone array 201 and a DSP 1403 having a low power consumption design devised for portable devices, a four-channel codec 1402, and a flash memory 1404. The DSP 1403 chip is powerful enough to handle the DSP 1403 computations in the microphone array system 200 disclosed herein. The hardware configuration of this example can be used for any microphone array configuration, with suitable modifications to the software. In an embodiment, the adaptive beamforming unit 203 of the microphone array system 200 is implemented as hardware with software instructions programmed on the DSP 1403. The DSP 1403 is programmed for beamforming, noise reduction, echo cancellation, and USB interfacing according to the method disclosed herein, and fine tuned for optimal performance.

Figure 15A:
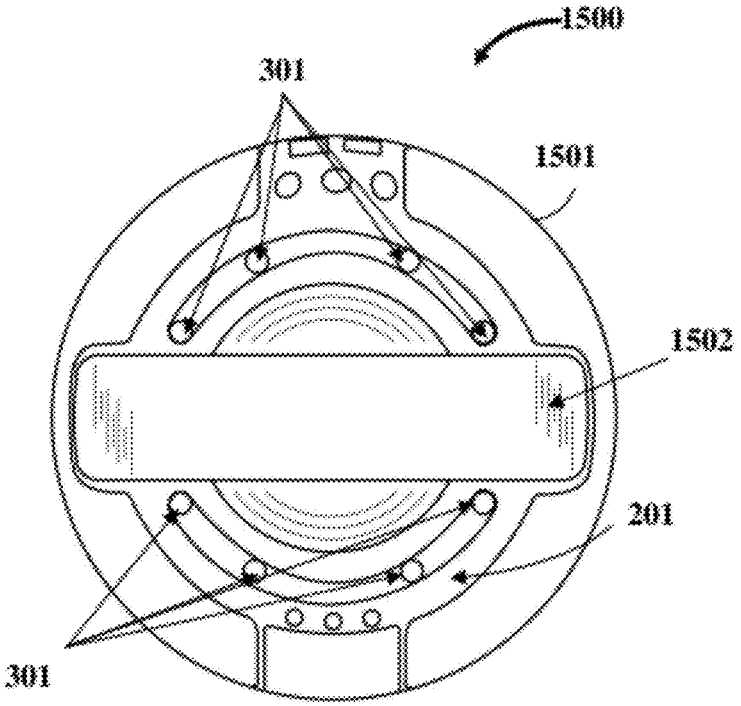
FIGS. 15A-15C exemplarily illustrate a conference phone comprising an eight-sensor microphone array.
Figure 15B:
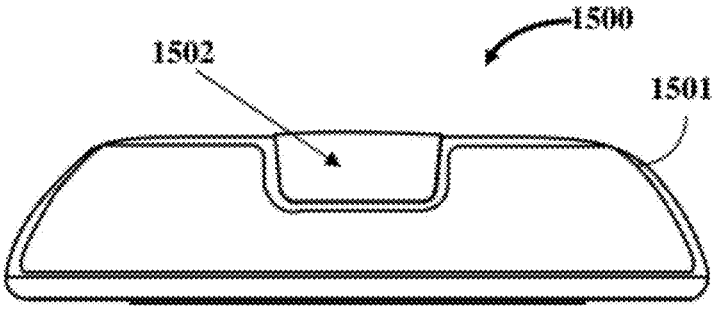
Figure 15C:
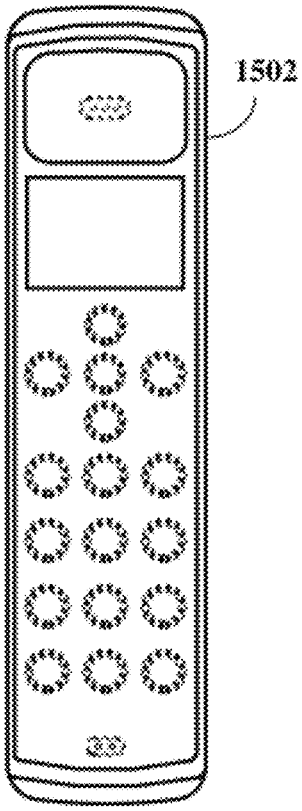

FIGS. 15A-15C exemplarily illustrate a conference phone 1500 comprising an eight-sensor microphone array 201. The eight-sensor microphone array 201 comprises eight sound sensors 301 arranged in a configuration as exemplarily illustrated in FIG. 15A. A top view of the conference phone 1500 comprising the eight-sensor microphone array 201 is exemplarily illustrated in FIG. 15A. A front view of the conference phone 1500 comprising the eight-sensor microphone array 201 is exemplarily illustrated in FIG. 15B. A headset 1502 that can be placed in a base holder 1501 of the conference phone 1500 having the eight-sensor microphone array 201 is exemplarily illustrated in FIG. 15C. In addition to a conference phone 1500, the microphone array system 200 disclosed herein with broadband beamforming can be configured for a mobile phone, a tablet computer, etc., for speech enhancement and noise reduction.

Figure 16A:
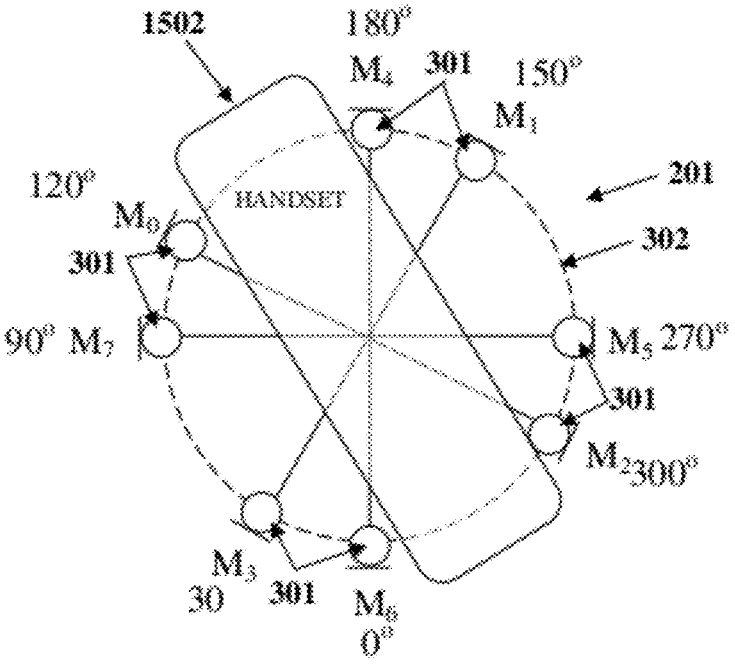
FIG. 16A exemplarily illustrates a layout of an eight-sensor microphone array for a conference phone.

FIG. 16A exemplarily illustrates a layout of an eight-sensor microphone array 201 for a conference phone 1500. Consider an example of a circular microphone array 201 in which eight sound sensors 301 are mounted on the surface of the conference phone 1500 as exemplarily illustrated in FIG. 15A. The conference phone 1500 has a removable handset 1502 on top, and hence the microphone array system 200 is configured to accommodate the handset 1502 as exemplarily illustrated in FIGS. 15A-15C. In an example, the circular microphone array 201 has a diameter of about four inches. Eight sound sensors 301, for example, microphones, $M_0$, $M_1$, $M_2$, $M_3$, $M_4$, $M_5$, $M_6$, and $M_7$ are distributed along a circle 302 on the conference phone 1500.

Microphones $M_4$-$M_7$ are separated by 90 degrees from each other, and microphones $M_o$-$M_3$ are rotated counterclockwise by 60 degrees from microphone $M_4$-$M_7$ respectively.

Figure 16B:
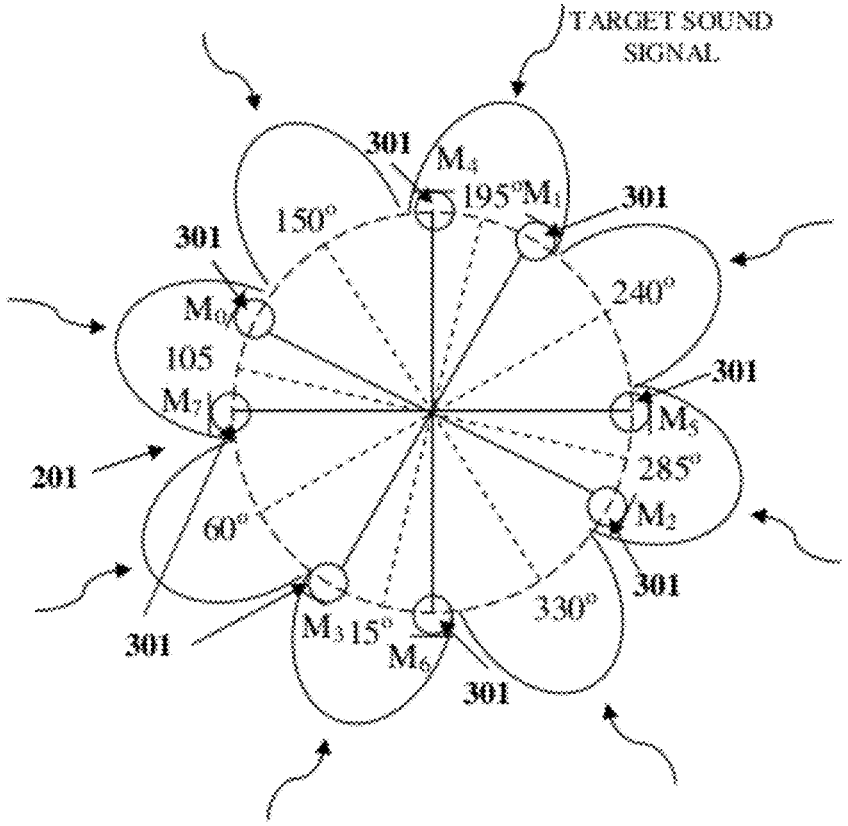
FIG. 16B exemplarily illustrates a graphical representation of eight spatial regions to which the eight-sensor microphone array of FIG. 16A responds.

FIG. 16B exemplarily illustrates a graphical representation of eight spatial regions to which the eight-sensor microphone array 201 of FIG. 16A responds. The space is divided into eight spatial regions with equal spaces centered at 15°, 60°, 105°, 150°, 195°, 240°, 285°, and 330° respectively. The adaptive beamforming unit 203 configures the eight-sensor microphone array 201 to automatically point to one of these eight spatial regions according to the location of the target sound signal from the target sound source as estimated by the sound source localization unit 202.

Figure 16C:
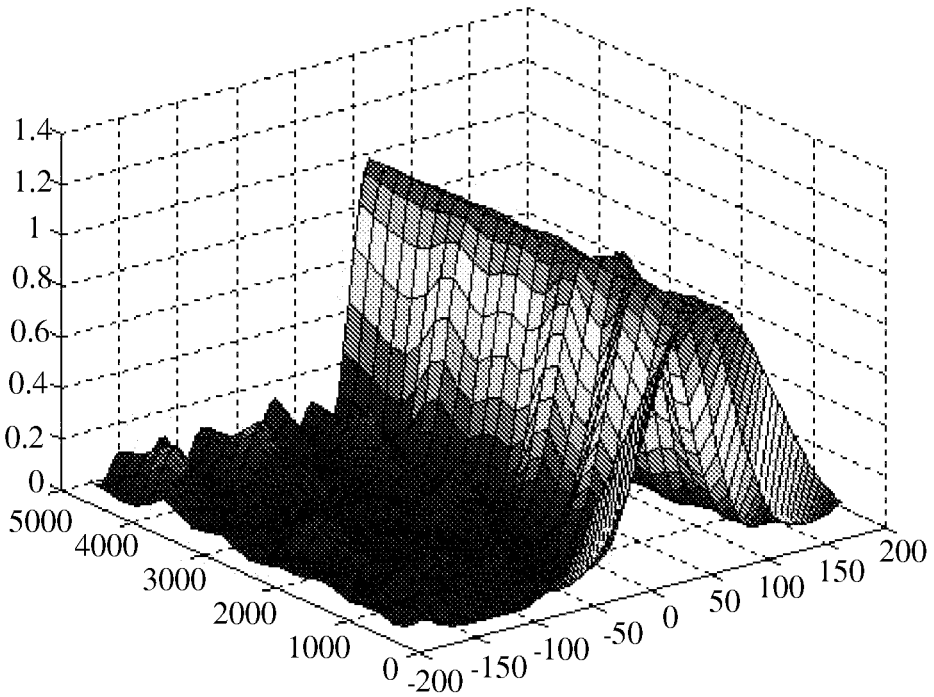
FIGS. 16C-16D exemplarily illustrate computer simulations showing the steering of the directivity patterns of the eight-sensor microphone array of FIG. 16A in the directions of 15° and 60° respectively, in the frequency range 300 Hz to 5 kHz.
Figure 16D:
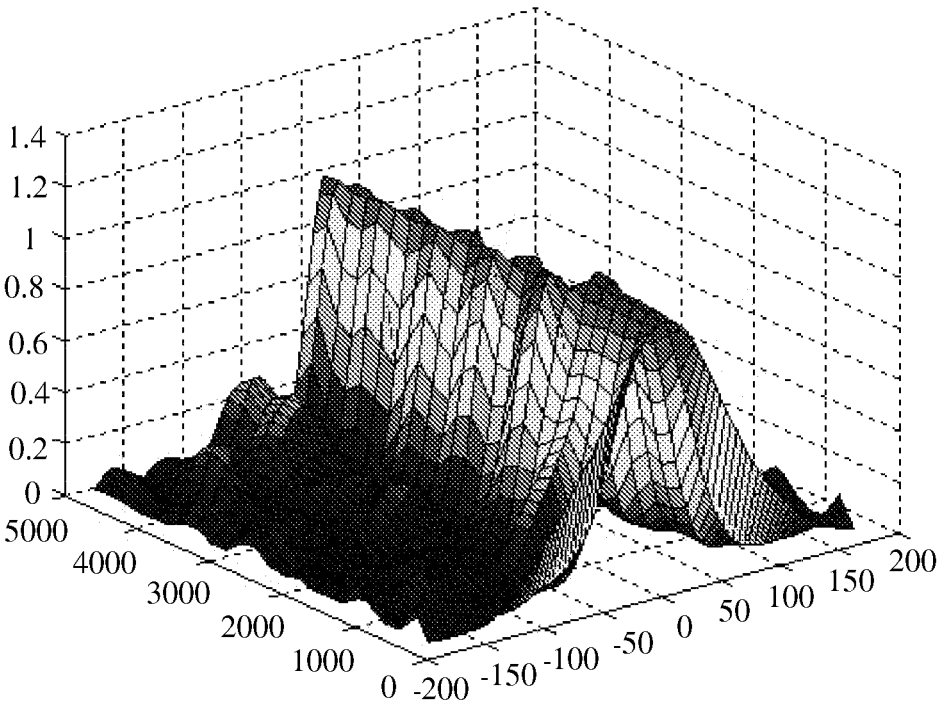

FIGS. 16C-16D exemplarily illustrate computer simulations showing the steering of the directivity patterns of the eight-sensor microphone array 201 of FIG. 16A, in the directions 15° and 60° respectively, in the frequency range 300 Hz to 5 kHz. FIG. 16C exemplarily illustrates the computer simulation result showing the directivity pattern of the microphone array 201 when the target sound signal is received from the target sound source in the spatial region centered at 15°.

The computer simulation for verifying the performance of the adaptive beamforming unit 203 when the target sound signal is received from the target sound source in the spatial region centered at 15° uses the following parameters:

Sampling frequency fs=16 k,

FIR filter taper length L=20

Passband $(\Theta_p, \Omega_p)$={300-5000 Hz, −5°-35°}, designed spatial directivity pattern is 1.

Stopband $(\Theta_s, \Omega_s)$={300~5000 Hz, −180°~−15°+45°~180°}, the designed spatial directivity pattern is 0.

It can be seen that the directivity pattern of the microphone array 201 in the spatial region centered at 15° is enhanced while the sound signals from all other spatial regions are suppressed.

FIG. 16D exemplarily illustrates the computer simulation result showing the directivity pattern of the microphone array 201 when the target sound signal is received from the target sound source in the spatial region centered at 60°. The computer simulation for verifying the performance of the adaptive beamforming unit 203 when the target sound signal is received from the target sound source in the spatial region centered at 60° uses the following parameters:

Sampling frequency fs=16 k,

FIR filter taper length L=20

Passband $(\Theta_p, \Omega_p)$={300-5000 Hz, 40°-80°}, designed spatial directivity pattern is 1.

Stopband $(\Theta_s, \Omega_s)$={300~5000 Hz, −180°~30°+90°~180°}, the designed spatial directivity pattern is 0.

It can be seen that the directivity pattern of the microphone array 201 in the spatial region centered at 60° is enhanced while the sound signals from all other spatial regions are suppressed. The other six spatial regions have similar parameters. Moreover, in all frequencies, the main lobe has the same level, which means the target sound signal has little distortion in frequency.

FIGS. 16E-16L exemplarily illustrate graphical representations showing the directivity patterns of the eight-sensor microphone array 201 of FIG. 16A in each of the eight spatial regions, where each directivity pattern is an average response from 300 Hz to 5000 Hz. The main lobe is about 10 dB higher than the side lobe, and therefore the ambient noise signals from other directions are highly suppressed compared to the target sound signal in the pass direction. The microphone array system 200 calculates the filter coefficients for the target sound signal, for example, speech signals from each sound sensor 301 and combines the filtered signals to enhance the speech from any specific direction. Since speech covers a large range of frequencies, the method and system 200 disclosed herein covers broadband signals from 300 Hz to 5000 Hz.

Figure 16E:
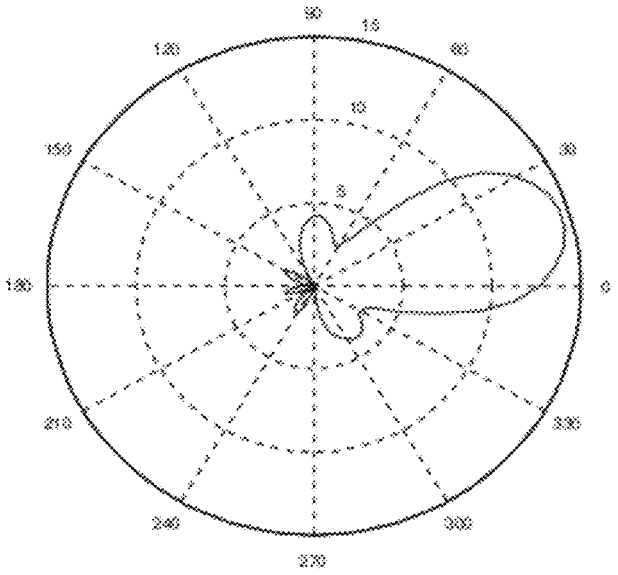
FIGS. 16E-16L exemplarily illustrate graphical representations showing the directivity patterns of the eight-sensor microphone array of FIG. 16A in each of the eight spatial regions, where each directivity pattern is an average response from 300 Hz to 5000 Hz.
Figure 16F:
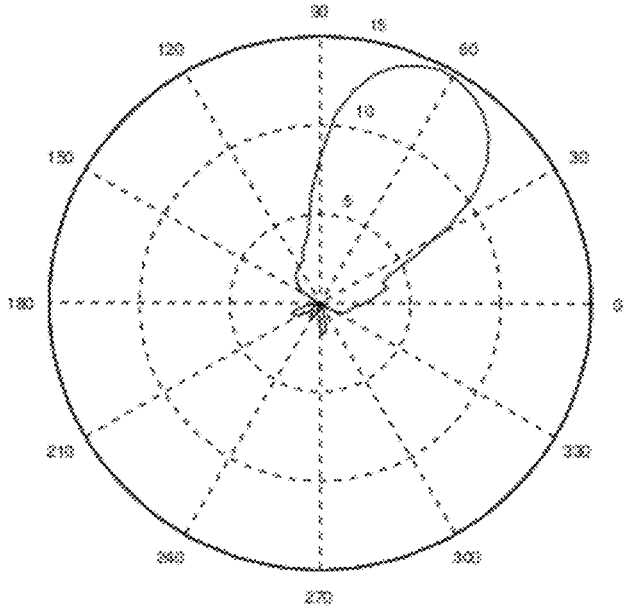
Figure 16G:
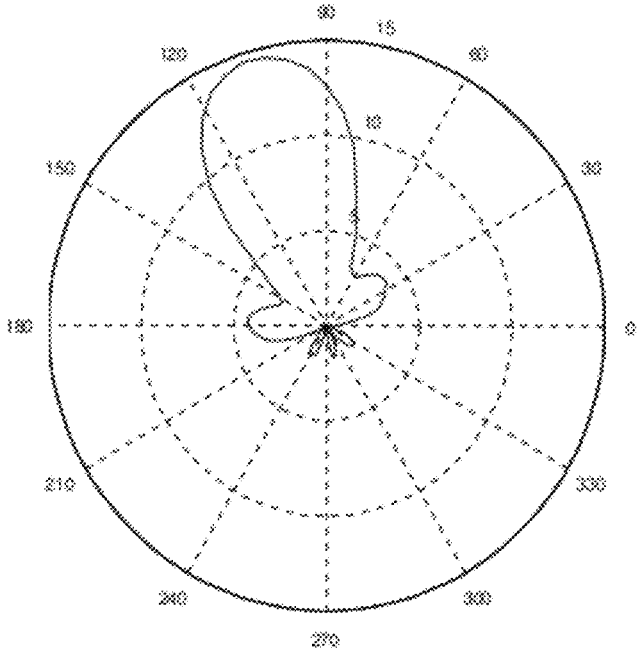
Figure 16H:
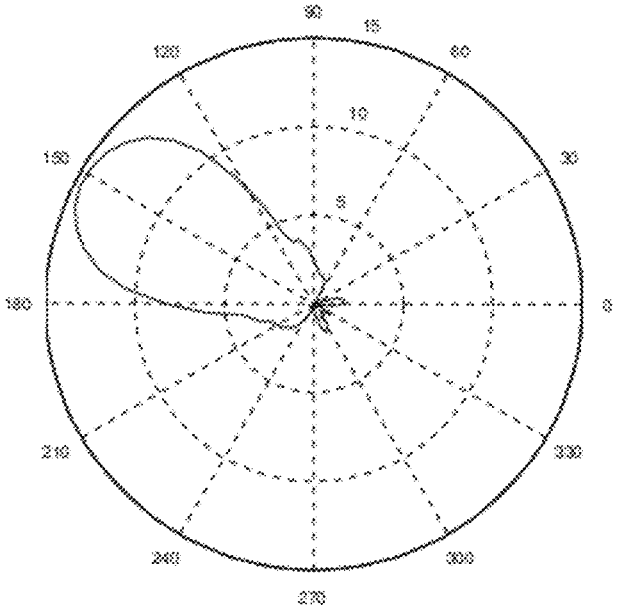
Figure 16I:
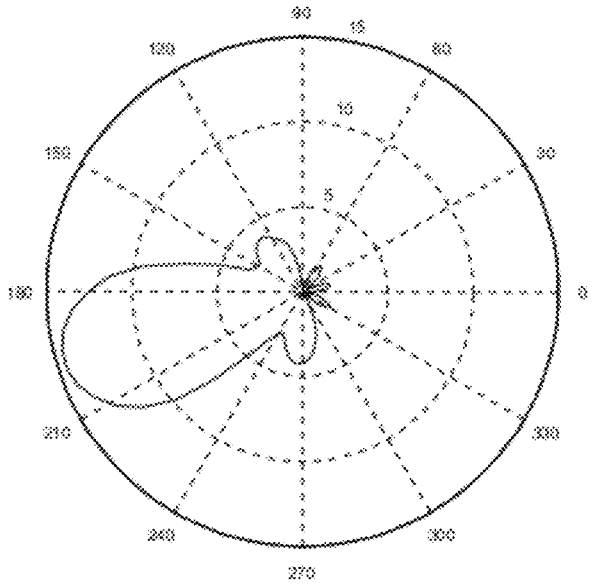
Figure 16J:
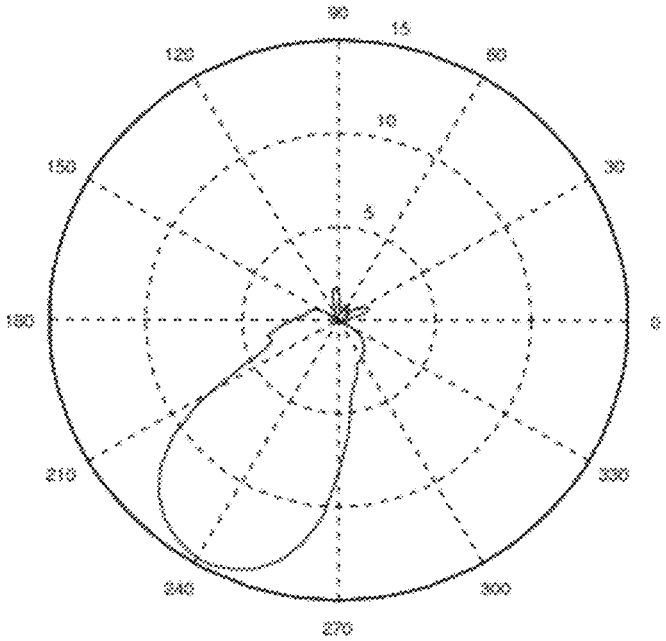
Figure 16K:
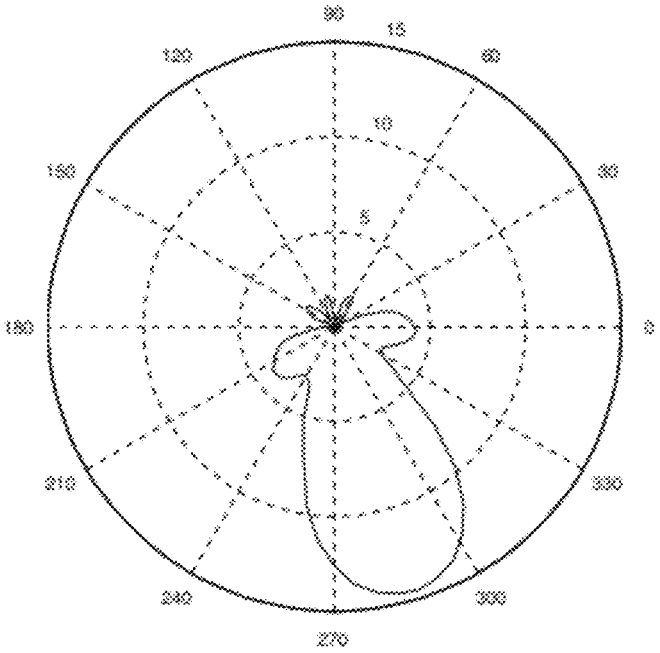
Figure 16L:
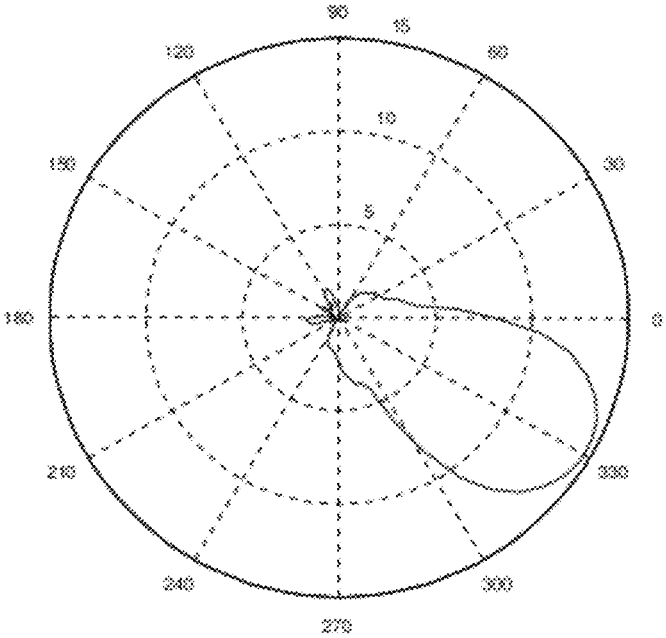

FIG. 16E exemplarily illustrates a graphical representation showing the directivity pattern of the eight-sensor microphone array 201 when the target sound signal is received from the target sound source in the spatial region centered at 15°. FIG. 16F exemplarily illustrates a graphical representation showing the directivity pattern of the eight-sensor microphone array 201 when the target sound signal is received from the target sound source in the spatial region centered at 60°. FIG. 16G exemplarily illustrates a graphical representation showing the directivity pattern of the eight-sensor microphone array 201 when the target sound signal is received from the target sound source in the spatial region centered at 105°. FIG. 16H exemplarily illustrates a graphical representation showing the directivity pattern of the eight-sensor microphone array 201 when the target sound signal is received from the target sound source in the spatial region centered at 150°. FIG. 16I exemplarily illustrates a graphical representation showing the directivity pattern of the eight-sensor microphone array 201 when the target sound signal is received from the target sound source in the spatial region centered at 195°. FIG. 16J exemplarily illustrates a graphical representation showing the directivity pattern of the eight-sensor microphone array 201 when the target sound signal is received from the target sound source in the spatial region centered at 240°. FIG. 16K exemplarily illustrates a graphical representation showing the directivity pattern of the eight-sensor microphone array 201 when the target sound signal is received from the target sound source in the spatial region centered at 285°. FIG. 16L exemplarily illustrates a graphical representation showing the directivity pattern of the eight-sensor microphone array 201 when the target sound signal is received from the target sound source in the spatial region centered at 330°. The microphone array system 200 disclosed herein enhances the target sound signal from each of the directions 15°, 60°, 105°, 150°, 195°, 240°, 285°, and 330°, while suppressing the ambient noise signals from the other directions.

The microphone array system 200 disclosed herein can be implemented for a square microphone array configuration and a rectangular array configuration where a sound sensor 301 is positioned in each corner of the four-cornered array. The microphone array system 200 disclosed herein implements beamforming from plane to three dimensional sound sources.

Figure 17A:
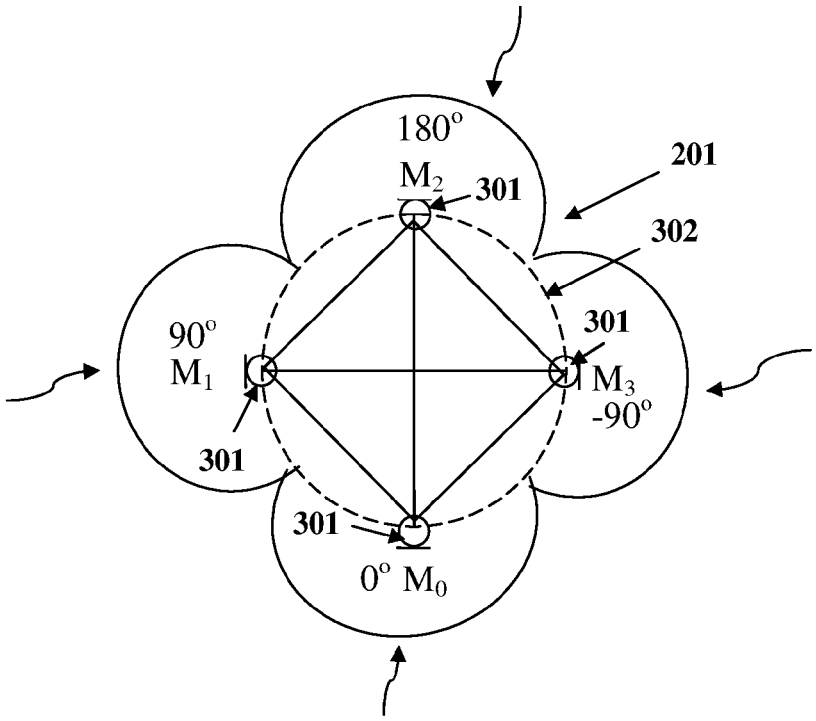
FIG. 17A exemplarily illustrates a graphical representation of four spatial regions to which a four-sensor microphone array for a wireless handheld device responds.

FIG. 17A exemplarily illustrates a graphical representation of four spatial regions to which a four-sensor microphone array 201 for a wireless handheld device responds. The wireless handheld device is, for example, a mobile phone. Consider an example where the microphone array 201 comprises four sound sensors 301, for example, microphones, uniformly distributed around a circle 302 having diameter equal to about two inches. This configuration is identical to positioning four sound sensors 301 or microphones on four corners of a square. The space is divided into four spatial regions with equal space centered at −90°, 0°, 90°, and 180° respectively. The adaptive beamforming unit 203 configures the four-sensor microphone array 201 to automatically point to one of these spatial regions according to the location of the target sound signal from the target sound source as estimated by the sound source localization unit 202.

FIGS. 17B-17I exemplarily illustrate computer simulations showing the directivity patterns of the four-sensor microphone array 201 of FIG. 17A with respect to azimuth and frequency. The results of the computer simulations performed for verifying the performance of the adaptive beamforming unit 203 of the microphone array system 200 disclosed herein for a sampling frequency $f_s$=16 k and FIR filter taper length L=20, are as follows:

For the spatial region centered at 0°:

Passband ($\Theta_p$, $\Omega_p$)={300-4000 Hz, −20°-20°}, designed spatial directivity pattern is 1.

Stopband ($\Theta$, $\Omega_s$)={300~4000 Hz, −180°~−30°+30°~180°}, the designed spatial directivity pattern is 0.

For the spatial region centered at 90°:

Passband ($\Theta_p$, $\Omega_p$)={300-4000 Hz, 70°-110°}, designed spatial directivity pattern is 1.

Stopband ($\Theta_s$, $\Omega_s$)={300~4000 Hz, −180°~60°+120°~180°}, the designed spatial directivity pattern is 0. The directivity patterns for the spatial regions centered at −90° and 180° are similarly obtained.

Figure 17B:
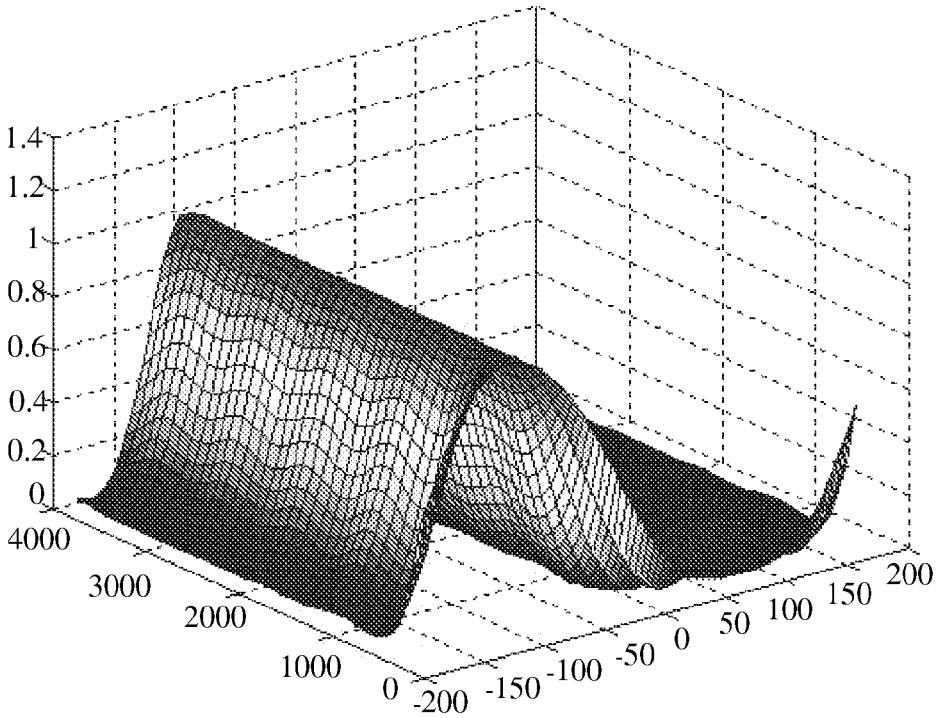
FIGS. 17B-17I exemplarily illustrate computer simulations showing the directivity patterns of the four-sensor microphone array of FIG. 17A with respect to azimuth and frequency.
Figure 17C:
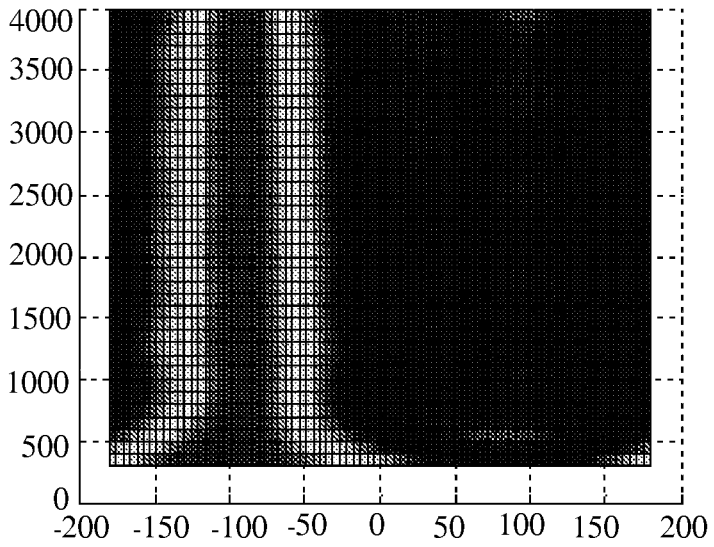

FIG. 17B exemplarily illustrates the computer simulation result representing a three dimensional (3D) display of the directivity pattern of the four-sensor microphone array 201 when the target sound signal is received from the target sound source in the spatial region centered at −90°. FIG. 17C exemplarily illustrates the computer simulation result representing a 2D display of the directivity pattern of the four-sensor microphone array 201 when the target sound signal is received from the target sound source in the spatial region centered at −90°.

Figure 17D:
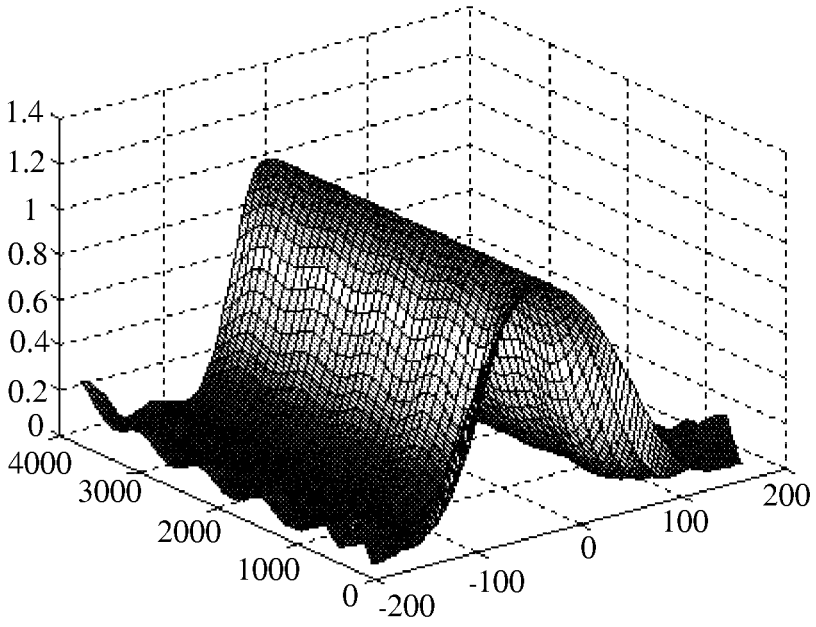
Figure 17E:
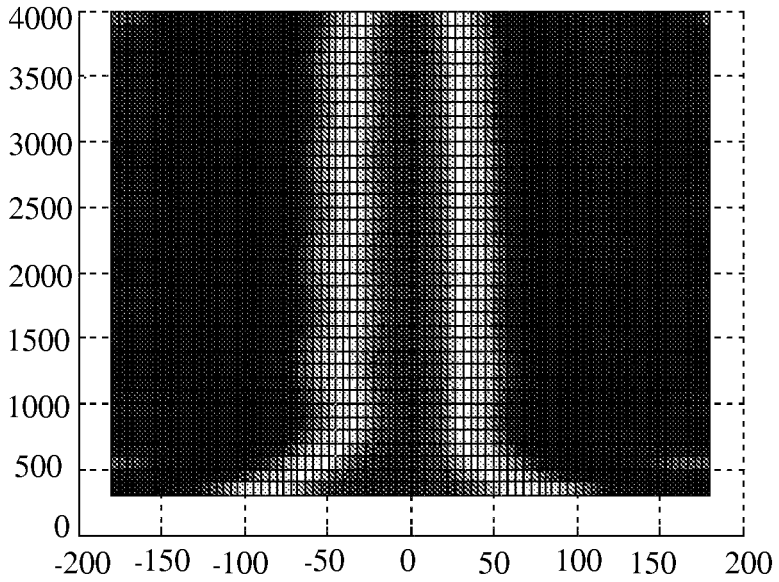

FIG. 17D exemplarily illustrates the computer simulation result representing a 3D display of the directivity pattern of the four-sensor microphone array 201 when the target sound signal is received from the target sound source in the spatial region centered at 0°. FIG. 17E exemplarily illustrates the computer simulation result representing a 2D display of the directivity pattern of the four-sensor microphone array 201 when the target sound signal is received from the target sound source in the spatial region centered at 0°.

Figure 17F:
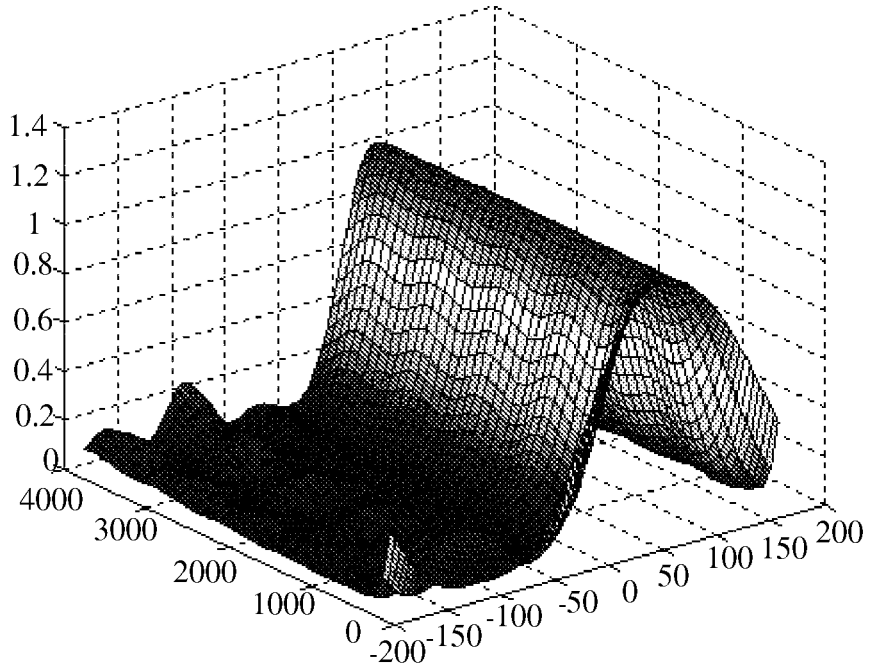
Figure 17G:
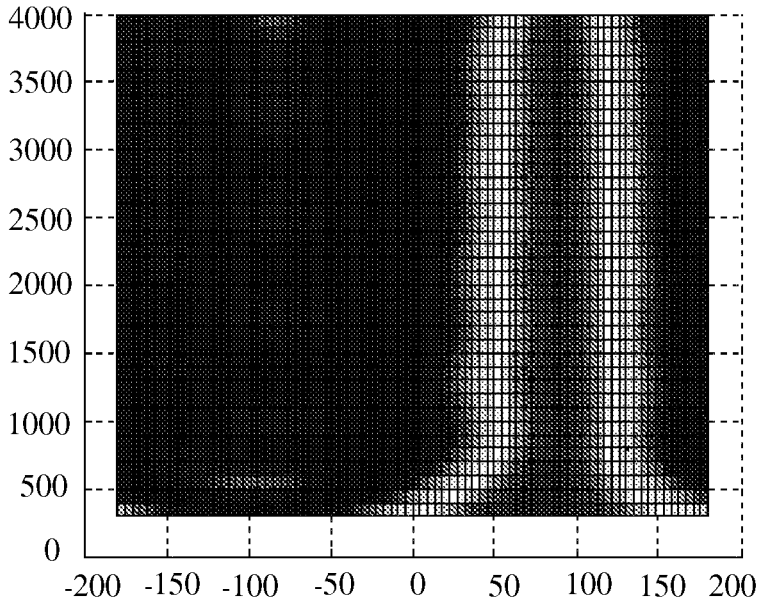

FIG. 17F exemplarily illustrates the computer simulation result representing a 3D display of the directivity pattern of the four-sensor microphone array 201 when the target sound signal is received from the target sound source in the spatial region centered at 90°. FIG. 17G exemplarily illustrates the computer simulation result representing a 2D display of the directivity pattern of the four-sensor microphone array 201 when the target sound signal is received from the target sound source in the spatial region centered at 90°.

Figure 17H:
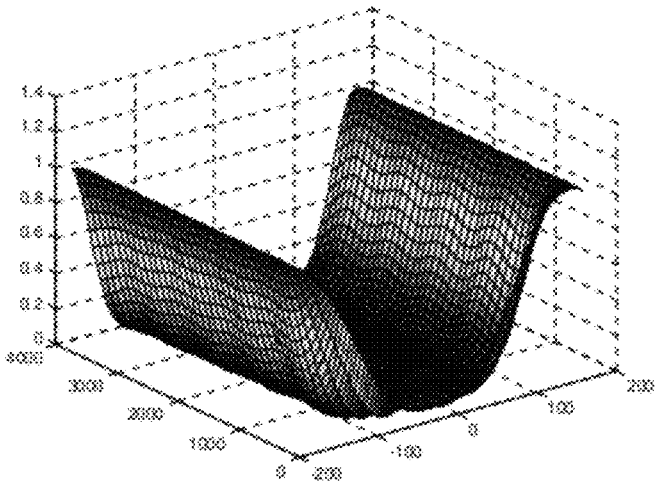
Figure 17I:
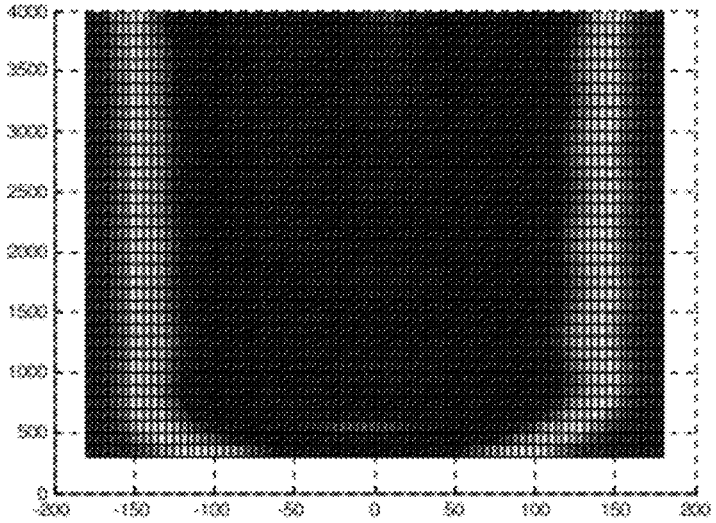

FIG. 17H exemplarily illustrates the computer simulation result representing a 3D display of the directivity pattern of the four-sensor microphone array 201 when the target sound source is received from the target sound source in the spatial region centered at 180°. FIG. 17I exemplarily illustrates the computer simulation result representing a 2D display of the directivity pattern of the four-sensor microphone array 201 when the target sound source is received from the target sound source in the spatial region centered at 180°. The 3D displays of the directivity patterns in FIG. 17B, FIG. 17D, FIG. 17F, and FIG. 17H demonstrate that the passbands have the same height. The 2D displays of the directivity patterns in FIG. 17C, FIG. 17E, FIG. 17G, and FIG. 17I demonstrate that the passbands have the same width along the frequency and demonstrates the broadband properties of the microphone array 201.

Figure 18A:
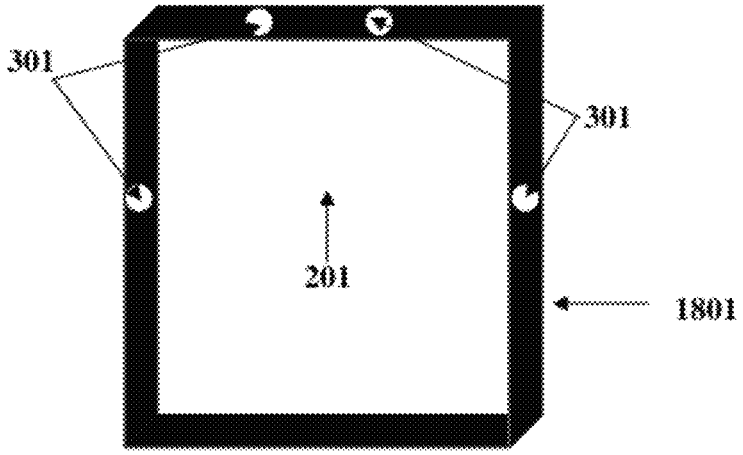
FIGS. 18A-18B exemplarily illustrate a microphone array configuration for a tablet computer.
Figure 18B:
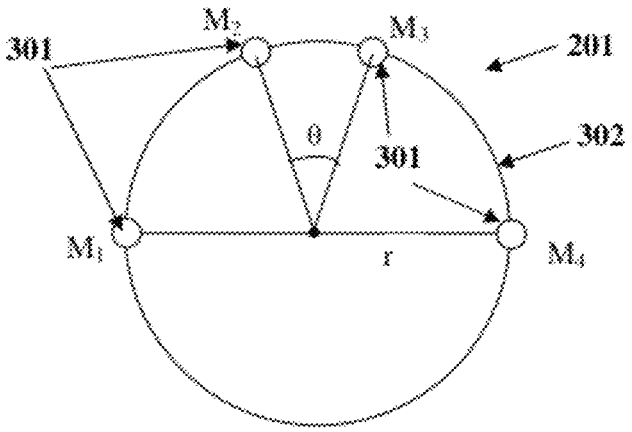

FIGS. 18A-18B exemplarily illustrates a microphone array configuration for a tablet computer. In this example, four sound sensors 301 of the microphone array 201 are positioned on a frame 1801 of the tablet computer, for example, the iPad® of Apple Inc. Geometrically, the sound sensors 301 are distributed on the circle 302 as exemplarily in FIG. 18B. The radius of the circle 302 is equal to the width of the tablet computer. The angle θ between the sound sensors 301 $M_2$ and $M_3$ is determined to avoid spatial aliasing up to 4000 Hz. This microphone array configuration enhances a front speaker's voice and suppresses background ambient noise. The adaptive beamforming unit 203 configures the microphone array 201 to form an acoustic beam 1802 pointing frontwards using the method and system 200 disclosed herein. The target sound signal, that is, the front speaker's voice within the range of Φ<30° is enhanced compared to the sound signals from other directions.

Figure 18C:
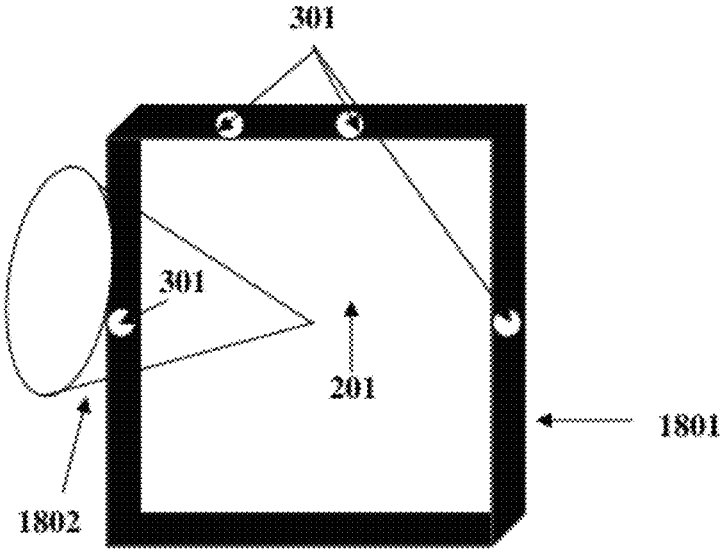
FIG. 18C exemplarily illustrates an acoustic beam formed using the microphone array configuration of FIGS. 18A-18B according to the method and system disclosed herein.

FIG. 18C exemplarily illustrates an acoustic beam 1802 formed using the microphone array configuration of FIGS. 18A-18B according to the method and system 200 disclosed herein.

Figure 18D:
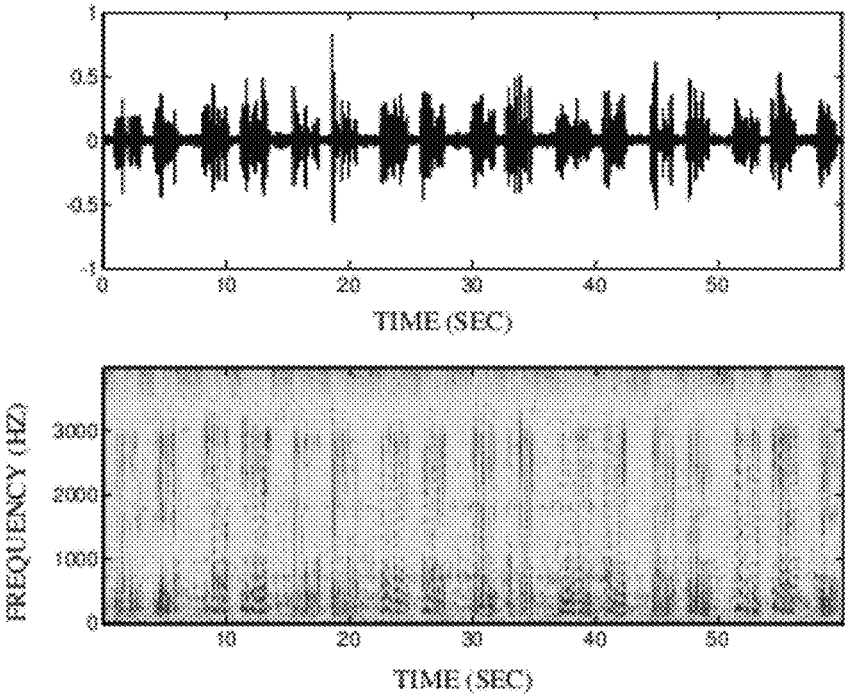
FIGS. 18D-18G exemplarily illustrate graphs showing processing results of the adaptive beamforming unit and the noise reduction unit for the microphone array configuration of FIG. 18B, in both a time domain and a spectral domain for the tablet computer.
Figure 18E:
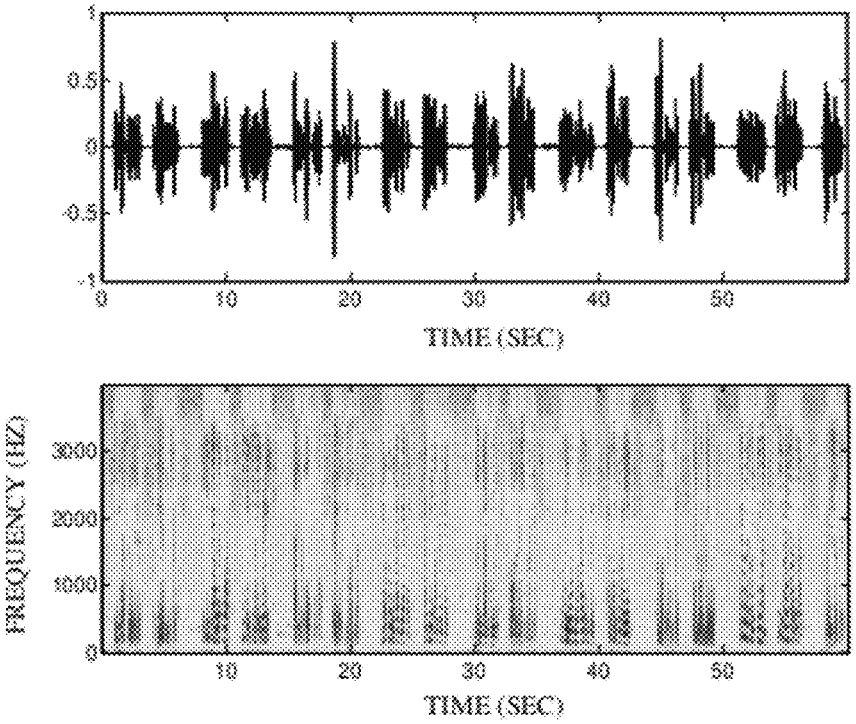
Figure 18F:
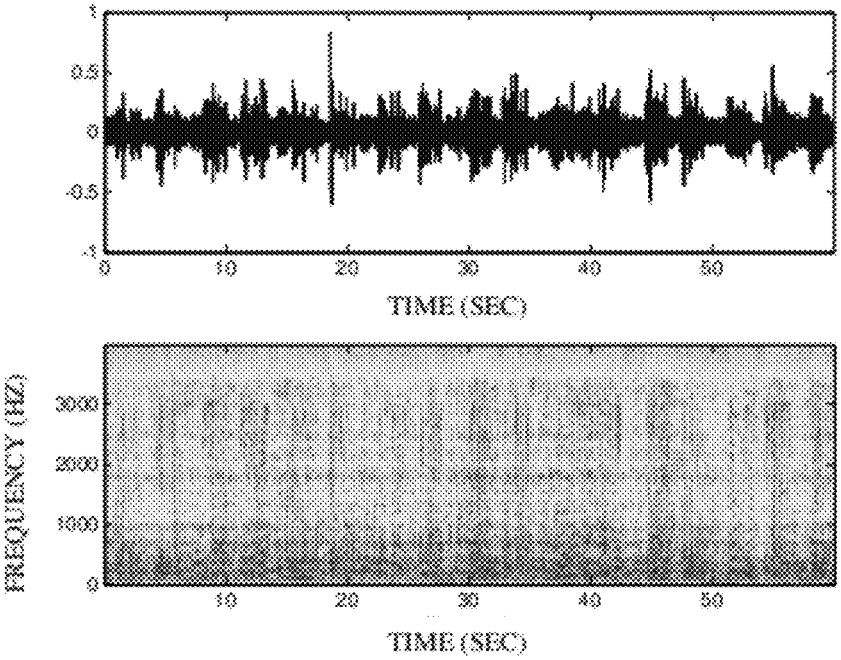
Figure 18G:
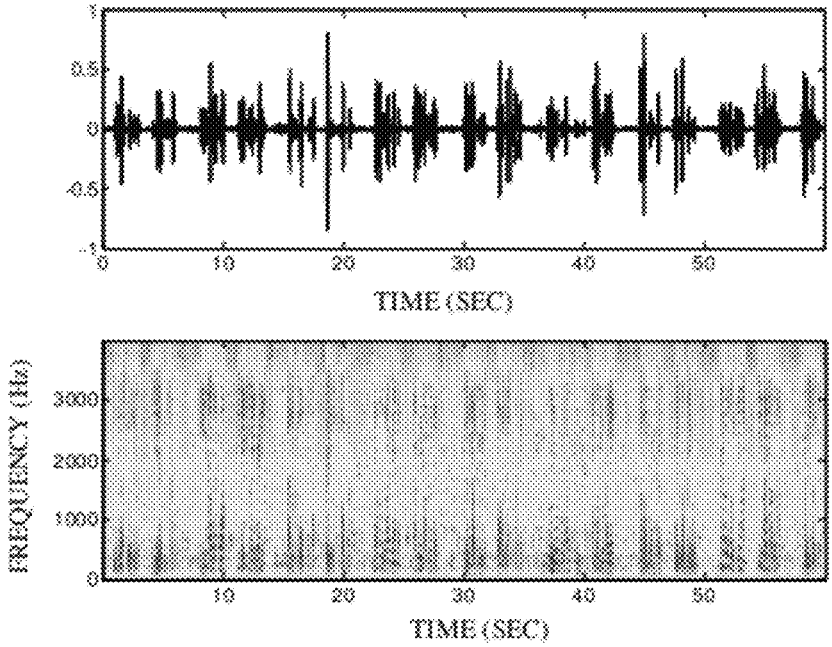

FIGS. 18D-18G exemplarily illustrates graphs showing processing results of the adaptive beamforming unit 203 and the noise reduction unit 207 for the microphone array configuration of FIG. 18B, in both a time domain and a spectral domain for the tablet computer. Consider an example where a speaker is talking in front of the tablet computer with ambient noise signals on the side. FIG. 18D exemplarily illustrates a graph showing the performance of the microphone array 201 before performing beamforming and noise reduction with a signal-to-noise ratio (SNR) of 15 dB. FIG. 18E exemplarily illustrates a graph showing the performance of the microphone array 201 after performing beamforming and noise reduction, according to the method disclosed herein, with an SNR of 15 dB. FIG. 18F exemplarily illustrates a graph showing the performance of the microphone array 201 before performing beamforming and noise reduction with an SNR of 0 dB. FIG. 18G exemplarily illustrates a graph showing the performance of the microphone array 201 after performing beamforming and noise reduction, according to the method disclosed herein, with an SNR of 0 dB.

It can be seen from FIGS. 18D-18G that the performance graph is noisier for the microphone array 201 before the beamforming and noise reduction is performed. Therefore, the adaptive beamforming unit 203 and the noise reduction unit 207 of the microphone array system 200 disclosed herein suppresses ambient noise signals while maintaining the clarity of the target sound signal, for example, the speech signal.

Figure 19C:
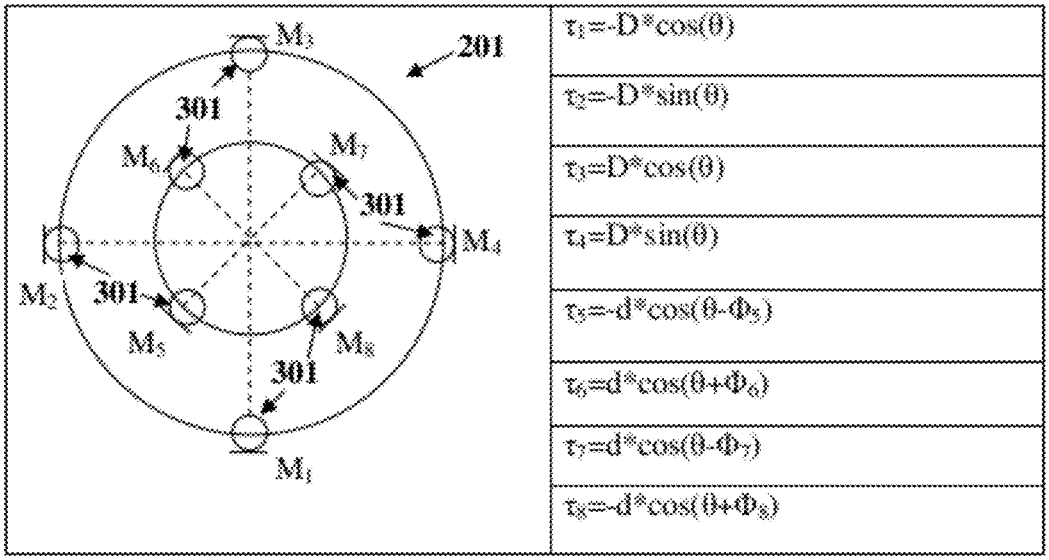
Figure 19D:
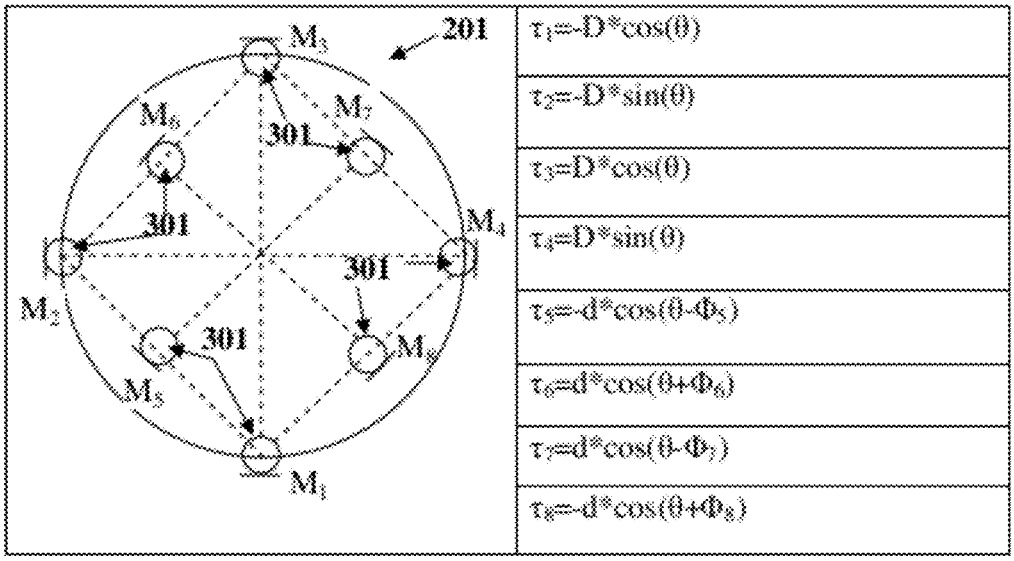
Figure 19E:
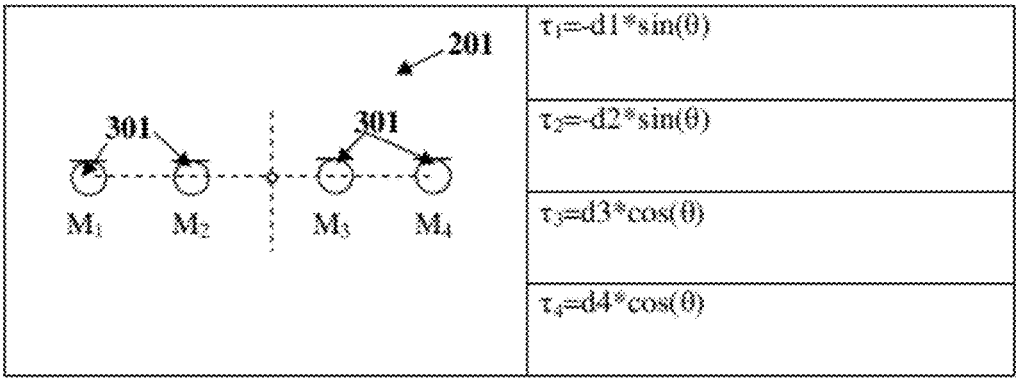
Figure 19F:
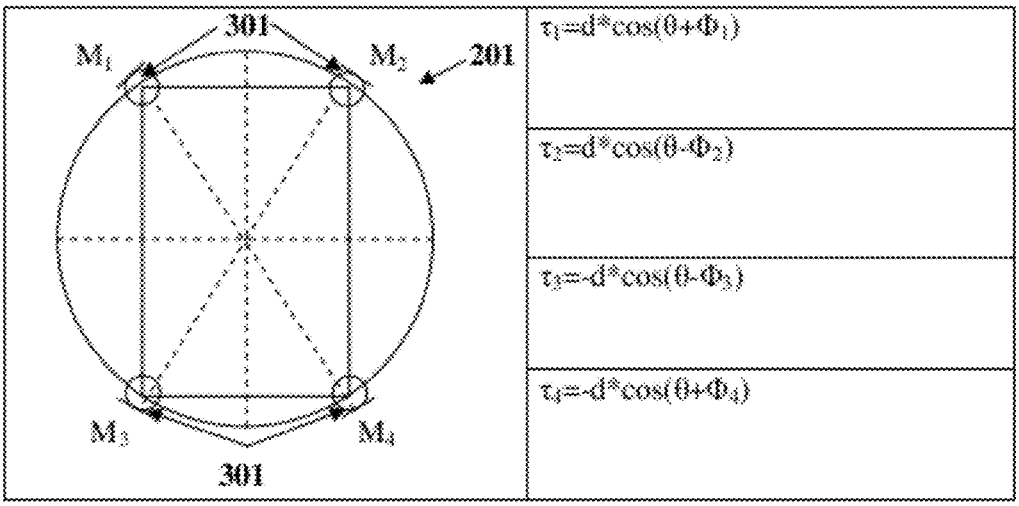

FIGS. 19A-19F exemplarily illustrate tables showing different microphone array configurations and the corresponding values of delay $\tau_n$ for the sound sensors 301 in each of the microphone array configurations. The broadband beamforming method disclosed herein can be used for microphone arrays 201 with arbitrary numbers of sound sensors 301 and arbitrary locations of the sound sensors 301. The sound sensors 301 can be mounted on surfaces or edges of any speech acquisition device. For any specific microphone array configuration, the only parameter that needs to be defined to achieve the beamformer coefficients is the value of; for each sound sensor 301 as disclosed in the detailed description of FIG. 5, FIGS. 6A-6B, and FIGS. 7A-7C and as exemplarily illustrated in FIGS. 19A-19F. In an example, the microphone array configuration exemplarily illustrated in FIG. 19F is implemented on a handheld device for hands-free speech acquisition. In a hands-free and non-close talking scenario, a user prefers to talk in distance rather than speaking close to the sound sensor 301 and may want to talk while watching a screen of the handheld device. The microphone array system 200 disclosed herein allows the handheld device to pick up sound signals from the direction of the speaker's mouth and suppress noise from other directions. The method and system 200 disclosed herein may be implemented on any device or equipment, for example, a voice recorder where a target sound signal or speech needs to be enhanced.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

[1. A method for enhancing a target sound signal from a plurality of sound signals, comprising:

providing a microphone array system comprising an array of sound sensors positioned in an arbitrary configuration, a sound source localization unit, an adaptive beamforming unit, and a noise reduction unit, wherein said sound source localization unit, said adaptive beamforming unit, and said noise reduction unit are in operative communication with said array of said sound sensors;

receiving said sound signals from a plurality of disparate sound sources by said sound sensors, wherein said received sound signals comprise said target sound signal from a target sound source among said disparate sound sources, and ambient noise signals;

determining a delay between each of said sound sensors and an origin of said array of said sound sensors as a function of distance between each of said sound sensors and said origin, a predefined angle between each of said sound sensors and a reference axis, and an azimuth angle between said reference axis and said target sound signal, when said target sound source that emits said target sound signal is in a two dimensional plane, wherein said delay is represented in terms of number of samples, and wherein said determination of said delay enables beamforming for arbitrary numbers of said sound sensors and a plurality of arbitrary configurations of said array of said sound sensors;

estimating a spatial location of said target sound signal from said received sound signals by said sound source localization unit;

performing adaptive beamforming for steering a directivity pattern of said array of said sound sensors in a direction of said spatial location of said target sound signal by said adaptive beamforming unit, wherein said adaptive beamforming unit enhances said target sound signal and partially suppresses said ambient noise signals; and suppressing said ambient noise signals by said noise reduction unit for further enhancing said target sound signal.]

[2. The method of claim 1, wherein said spatial location of said target sound signal from said target sound source is estimated using a steered response power-phase transform by said sound source localization unit.]

[3. The method of claim 1, wherein said adaptive beamforming comprises:

providing a fixed beamformer, a blocking matrix, and an adaptive filter in said adaptive beamforming unit;

steering said directivity pattern of said array of said sound sensors in said direction of said spatial location of said target sound signal from said target sound source by said fixed beamformer for enhancing said target sound signal, when said target sound source is in motion;

feeding said ambient noise signals to said adaptive filter by blocking said target sound signal received from said target sound source using said blocking matrix; and adaptively filtering said ambient noise signals by said adaptive filter in response to detecting one of presence and absence of said target sound signal in said sound signals received from said disparate sound sources.]

[4. The method of claim 3, wherein said fixed beamformer performs fixed beamforming by filtering and summing output sound signals from said sound sensors.]

[5. The method of claim 3, wherein said adaptive filtering comprises sub-band adaptive filtering performed by said adaptive filter, wherein said sub-band adaptive filtering comprises:

providing an analysis filter bank, an adaptive filter matrix, and a synthesis filter bank in said adaptive filter;

splitting said enhanced target sound signal from said fixed beamformer and said ambient noise signals from said blocking matrix into a plurality of frequency sub-bands by said analysis filter bank;

adaptively filtering said ambient noise signals in each of said frequency sub-bands by said adaptive filter matrix in response to detecting one of presence and absence of said target sound signal in said sound signals received from said disparate sound sources; and synthesizing a full-band sound signal using said frequency sub-bands of said enhanced target sound signal by said synthesis filter bank.]

[6. The method of claim 3, wherein said adaptive beamforming further comprises detecting said presence of said target sound signal by an adaptation control unit provided in said adaptive beamforming unit and adjusting a step size for said adaptive filtering in response to detecting one of said presence and said absence of said target sound signal in said sound signals received from said disparate sound sources.]

[7. The method of claim 1, wherein said noise reduction unit performs noise reduction by using one of a Wiener-filter based noise reduction algorithm, a spectral subtraction noise reduction algorithm, an auditory transform based noise reduction algorithm, and a model based noise reduction algorithm.]

[8. The method of claim 1, wherein said noise reduction unit performs noise reduction in a plurality of frequency sub-bands, wherein said frequency sub-bands are employed by an analysis filter bank of said adaptive beamforming unit for sub-band adaptive beamforming.]

[9. A system for enhancing a target sound signal from a plurality of sound signals, comprising:

an array of sound sensors positioned in an arbitrary configuration, wherein said sound sensors receive said sound signals from a plurality of disparate sound sources, wherein said received sound signals comprise said target sound signal from a target sound source among said disparate sound sources, and ambient noise signals;

a sound source localization unit that estimates a spatial location of said target sound signal from said received sound signals, by determining a delay between each of said sound sensors and an origin of said array of said sound sensors as a function of distance between each of said sound sensors and said origin, a predefined angle between each of said sound sensors and a reference axis, and an azimuth angle between said reference axis and said target sound signal, when said target sound source that emits said target sound signal is in a two dimensional plane, wherein said delay is represented in terms of number of samples, and wherein said determination of said delay enables beamforming for arbitrary numbers of said sound sensors and a plurality of arbitrary configurations of said array of said sound sensors;

an adaptive beamforming unit that steers directivity pattern of said array of said sound sensors in a direction of said spatial location of said target sound signal, wherein said adaptive beamforming unit enhances said target sound signal and partially suppresses said ambient noise signals; and a noise reduction unit that suppresses said ambient noise signals for further enhancing said target sound signal.]

[10. The system of claim 9, wherein said sound source localization unit estimates said spatial location of said target sound signal from said target sound source using a steered response power-phase transform.]

[11. The system of claim 9, wherein said adaptive beamforming unit comprises:

a fixed beamformer that steers said directivity pattern of said array of said sound sensors in said direction of said spatial location of said target sound signal from said target sound source for enhancing said target sound signal, when said target sound source is in motion;

a blocking matrix that feeds said ambient noise signals to an adaptive filter by blocking said target sound signal received from said target sound source; and said adaptive filter that adaptively filters said ambient noise signals in response to detecting one of presence and absence of said target sound signal in said sound signals received from said disparate sound sources.]

[12. The system of claim 11, wherein said fixed beamformer performs fixed beamforming by filtering and summing output sound signals from said sound sensors.]

[13. The system of claim 11, wherein said adaptive filter comprises a set of sub-band adaptive filters comprising:

an analysis filter bank that splits said enhanced target sound signal from said fixed beamformer and said ambient noise signals from said blocking matrix into a plurality of frequency sub-bands;

an adaptive filter matrix that adaptively filters said ambient noise signals in each of said frequency sub-bands in response to detecting one of presence and absence of said target sound signal in said sound signals received from said disparate sound sources; and a synthesis filter bank that synthesizes a full-band sound signal using said frequency sub-bands of said enhanced target sound signal.]

[14. The system of claim 9, wherein said adaptive beamforming unit further comprises an adaptation control unit that detects said presence of said target sound signal and adjusts a step size for said adaptive filtering in response to detecting one of said presence and said absence of said target sound signal in said sound signals received from said disparate sound sources.]

[15. The system of claim 9, wherein said noise reduction unit is one of a Wiener-filter based noise reduction unit, a spectral subtraction noise reduction unit, an auditory transform based noise reduction unit, and a model based noise reduction unit.]

[16. The system of claim 9, further comprising one or more audio codecs that convert said sound signals in an analog form of said sound signals into digital sound signals and reconverts said digital sound signals into said analog form of said sound signals.]

[17. The system of claim 9, wherein said noise reduction unit performs noise reduction in a plurality of frequency sub-bands employed by an analysis filter bank of said adaptive beamforming unit for sub-band adaptive beamforming.]

[18. The system of claim 9, wherein said array of said sound sensors is one of a linear array of said sound sensors, a circular array of said sound sensors, and an arbitrarily distributed coplanar array of said sound sensors.]

[19. The method of claim 1, wherein said delay ($\tau$) is determined by a formula $\tau=f_s*t$, wherein $f_s$ is a sampling frequency and t is a time delay.]

[20. A method for enhancing a target sound signal from a plurality of sound signals, comprising:

providing a microphone array system comprising an array of sound sensors positioned in an arbitrary configuration, a sound source localization unit, an adaptive beamforming unit, and a noise reduction unit, wherein said sound source localization unit, said adaptive beamforming unit, and said noise reduction unit are in operative communication with said array of said sound sensors;

receiving said sound signals from a plurality of disparate sound sources by said sound sensors, wherein said received sound signals comprise said target sound signal from a target sound source among said disparate sound sources, and ambient noise signals;

determining a delay between each of said sound sensors and an origin of said array of said sound sensors as a function of distance between each of said sound sensors and said origin, a predefined angle between each of said sound sensors and a first reference axis, an elevation angle between a second reference axis and said target sound signal, and an azimuth angle between said first reference axis and said target sound signal, when said target sound source that emits said target sound signal is in a three dimensional plane, wherein said delay is represented in terms of number of samples, and wherein said determination of said delay enables beamforming for arbitrary numbers of said sound sensors and a plurality of arbitrary configurations of said array of said sound sensors;

estimating a spatial location of said target sound signal from said received sound signals by said sound source localization unit;

performing adaptive beamforming for steering a directivity pattern of said array of said sound sensors in a direction of said spatial location of said target sound signal by said adaptive beamforming unit, wherein said adaptive beamforming unit enhances said target sound signal and partially suppresses said ambient noise signals; and suppressing said ambient noise signals by said noise reduction unit for further enhancing said target sound signal.]

[21. A system for enhancing a target sound signal from a plurality of sound signals, comprising:

an array of sound sensors positioned in an arbitrary configuration, wherein said sound sensors receive said sound signals from a plurality of disparate sound sources, wherein said received sound signals comprise said target sound signal from a target sound source among said disparate sound sources, and ambient noise signals;

a sound source localization unit that estimates a spatial location of said target sound signal from said received sound signals as a function of distance between each of said sound sensors and said origin, a predefined angle between each of said sound sensors and a first reference axis, an elevation angle between a second reference axis and said target sound signal, and an azimuth angle between said first reference axis and said target sound signal, when said target sound source that emits said target sound signal is in a three dimensional plane, wherein said delay is represented in terms of number of samples, and wherein said determination of said delay enables beamforming for arbitrary numbers of said sound sensors and a plurality of arbitrary configurations of said array of said sound sensors;

an adaptive beamforming unit that steers directivity pattern of said array of said sound sensors in a direction of said spatial location of said target sound signal, wherein said adaptive beamforming unit enhances said target sound signal and partially suppresses said ambient noise signals; and a noise reduction unit that suppresses said ambient noise signals for further enhancing said target sound signal.]

*22. A method for enhancing a target sound signal from a plurality of sound signals, comprising:*

*providing a microphone array system comprising an array of sound sensors positioned in a linear, circular, or other configuration, a sound source localization unit, an adaptive beamforming unit, a noise reduction unit, and an echo cancellation unit, wherein said sound source localization unit, said adaptive beamforming unit, said noise reduction unit, and said echo cancellation unit are implemented in a digital signal processor, and wherein said digital signal processor is in operative communication with said array of said sound sensors;*

*receiving said sound signals from a plurality of disparate sound sources by said sound sensors, wherein said received sound signals comprise said target sound signal from a target sound source among said disparate sound sources, and ambient noise signals;*

*determining a delay between each of said sound sensors and an origin of said array of said sound sensors as a function of distance between each of said sound sensors and said origin, a predefined angle between each of said sound sensors and a reference axis, and an azimuth angle between said reference axis and said target sound signal, when said target sound source that emits said target sound signal is in a two dimensional plane, wherein said delay is represented in terms of number of samples, and wherein said determination of said delay enables beamforming for said array of said sound sensors in a plurality of configurations;*

*estimating a location of said target sound signal from said received sound signals by said sound source localization unit;*

*performing adaptive beamforming for steering a directivity pattern of said array of said sound sensors in a direction of said location of said target sound signal by said adaptive beamforming unit, wherein said adaptive beamforming unit enhances said target sound signal and partially suppresses said ambient noise signals;*

*performing echo cancellation by said echo cancellation unit for further enhancing said target sound signal; and*

*suppressing said ambient noise signals by said noise reduction unit for further enhancing said target sound signal.*

*23. The method of claim 22, wherein said location of said target sound signal from said target sound source is estimated using a steered response power-phase transform by said sound source localization unit.*

*24. The method of claim 22, wherein said adaptive beamforming comprises:*

*providing a fixed beamformer, a blocking matrix, and an adaptive filter in said adaptive beamforming unit;*

*steering said directivity pattern of said array of said sound sensors in said direction of said location of said target sound signal from said target sound source by said fixed beamformer for enhancing said target sound signal, when said target sound source is in motion;*

*feeding said ambient noise signals to said adaptive filter by blocking said target sound signal received from said target sound source using said blocking matrix; and*

*adaptively filtering said ambient noise signals by said adaptive filter in response to voice activity detection, wherein said voice activity detection comprises detecting one of presence and absence of said target sound signal in said sound signals received from said disparate sound sources.*

*25. The method of claim 24, wherein said fixed beamformer performs fixed beamforming by one of filtering and summing output sound signals from said sound sensors, and delaying and summing output sound signals from said sound sensors.*

*26. The method of claim 24, wherein said adaptive filtering comprises sub-band adaptive filtering performed by said adaptive filter, and wherein said sub-band adaptive filtering comprises:*

*providing an analysis filter bank, an adaptive filter matrix, and a synthesis filter bank in said adaptive filter;*

*splitting said enhanced target sound signal from said fixed beamformer and said ambient noise signals from said blocking matrix into a plurality of frequency sub-bands by said analysis filter bank;*

*adaptively filtering said ambient noise signals in each of said frequency sub-bands by said adaptive filter matrix in response to said detection of one of said presence and said absence of said target sound signal in said sound signals received from said disparate sound sources; and*

*synthesizing a full-band sound signal using said frequency sub-bands of said enhanced target sound signal by said synthesis filter bank.*

*27. The method of claim 24, wherein said adaptive beamforming further comprises detecting said presence of said target sound signal by an adaptation control unit provided in said adaptive beamforming unit and adjusting a step size for said adaptive filtering in response to said*

*detection of one of said presence and said absence of said target sound signal in said sound signals received from said disparate sound sources.*

*28. The method of claim 22, wherein said noise reduction unit performs noise reduction by using one of a Wiener-filter based noise reduction algorithm, a spectral subtraction noise reduction algorithm, an auditory transform based noise reduction algorithm, and a model based noise reduction algorithm.*

*29. The method of claim 22, wherein said noise reduction unit performs noise reduction in a plurality of frequency sub-bands, wherein said frequency sub-bands are employed by an analysis filter bank of said adaptive beamforming unit for sub-band adaptive beamforming, wherein said sound source localization unit calculates said delay* ($\tau$) *based on said number of samples within a time period and a time delay for said target sound signal to travel said distance between each of said sound sensors in said microphone array and said origin of said array of said sound sensors, and wherein said distance between said each of said sound sensors in the microphone array and said origin of said array of said sound sensors is either a same distance or a different distance.*

*30. A microphone array system for enhancing a target sound signal from a plurality of sound signals, comprising:*

*an array of sound sensors positioned in a linear, circular, or other configuration, wherein said sound sensors receive said sound signals from a plurality of disparate sound sources, wherein said received sound signals comprise said target sound signal from a target sound source among said disparate sound sources, and ambient noise signals;*

*a digital signal processor, said digital signal processor comprising:*

*a sound source localization unit that estimates a location of said target sound signal from said received sound signals, by determining a delay between each of said sound sensors and an origin of said array of said sound sensors as a function of distance between each of said sound sensors and said origin, a predefined angle between each of said sound sensors and a reference axis, and an azimuth angle between said reference axis and said target sound signal, when said target sound source that emits said target sound signal is in a two dimensional plane, wherein said delay is represented in terms of number of samples, and wherein said determination of said delay enables beamforming for said array of sound sensors in a plurality of configurations;*

*an adaptive beamforming unit that steers directivity pattern of said array of said sound sensors in a direction of said location of said target sound signal, wherein said adaptive beamforming unit enhances said target sound signal and partially suppresses said ambient noise signals;*

*an echo cancellation unit that performs echo cancellation for further enhancing said target sound signal; and*

*a noise reduction unit that suppresses said ambient noise signals for further enhancing said target sound signal.*

*31. The system of claim 30, wherein said sound source localization unit estimates said location of said target sound signal from said target sound source using a steered response power-phase transform.*

*32. The system of claim 30, wherein said adaptive beamforming unit comprises:*

*a fixed beamformer that steers said directivity pattern of said array of said sound sensors in said direction of said location of said target sound signal from said target sound source for enhancing said target sound signal, when said target sound source is in motion;*

*a blocking matrix that feeds said ambient noise signals to an adaptive filter by blocking said target sound signal received from said target sound source; and*

*said adaptive filter adaptively filters said ambient noise signals in response to voice activity detection, wherein said voice activity detection comprises detecting one of presence and absence of said target sound signal in said sound signals received from said disparate sound sources.*

*33. The system of claim 32, wherein said fixed beamformer performs fixed beamforming by one of filtering and summing output sound signals from said sound sensors, and delaying and summing output sound signals from said sound sensors.*

*34. The system of claim 32, wherein said adaptive filter comprises a set of sub-band adaptive filters comprising:*

*an analysis filter bank that splits said enhanced target sound signal from said fixed beamformer and said ambient noise signals from said blocking matrix into a plurality of frequency sub-bands;*

*an adaptive filter matrix that adaptively filters said ambient noise signals in each of said frequency sub-bands in response to said detection of one of said presence and said absence of said target sound signal in said sound signals received from said disparate sound sources; and*

*a synthesis filter bank that synthesizes a full-band sound signal using said frequency sub-bands of said enhanced target sound signal.*

*35. The system of claim 32, wherein said adaptive beamforming unit further comprises an adaptation control unit that detects said presence of said target sound signal and adjusts a step size for said adaptive filtering in response to said detection of one of said presence and said absence of said target sound signal in said sound signals received from said disparate sound sources.*

*36. The system of claim 30, wherein said noise reduction unit is one of a Wiener-filter based noise reduction unit, a spectral subtraction noise reduction unit, an auditory transform based noise reduction unit, and a model based noise reduction unit, wherein said noise reduction unit performs noise reduction in a plurality of frequency sub-bands employed by an analysis filter bank of said adaptive beamforming unit for sub-band adaptive beamforming, wherein said sound source localization unit calculates said delay* ($\tau$) *based on said number of samples within a time period and a time delay for said target sound signal to travel said distance between each of said sound sensors in said microphone array and said origin of said array of said sound sensors, and wherein said distance between said each of said sound sensors in the microphone array and said origin of said array of said sound sensors is either a same distance or a different distance.*

*37. The system of claim 30, further comprising one or more audio codecs that convert said sound signals in an analog form of said sound signals into digital sound signals and reconverts said digital sound signals into said analog form of said sound signals.*

*38. A microphone array system for enhancing a target sound signal from a plurality of sound signals, comprising:*

*an array of sound sensors, wherein said sound sensors receive said sound signals from a plurality of disparate*

*sound sources, wherein said received sound signals comprise said target sound signal from a target sound source among said disparate sound sources, and ambient noise signals;*

*a digital signal processor, said digital signal processor comprising:*

*a sound source localization unit that estimates a location of said target sound signal from said received sound signals by determining a delay between each of said sound sensors and a reference point of said array of said sound sensors as a function of distance between each of said sound sensors and said reference point and an angle of each of said sound sensors biased from a reference axis;*

*a beamforming unit that enhances said target sound signal and partially suppresses said ambient noise signals;*

*an echo cancellation unit that performs echo cancellation and further enhances said target sound signal; and*

*a noise reduction unit that suppresses said ambient noise signals and further enhances said target sound signal.*

*39. The system of claim 38, wherein said microphone array system is implemented in one of devices with speech acquisition capability, hands-free devices, handheld devices, conference phones and video conferencing applications, wherein said handheld devices comprise smart phones, tablet computers and laptop computers, and wherein said array of said sound sensors is one of a linear array of said sound sensors, a circular array of said sound sensors, and other types of array of said sound sensors.*

*40. The method of claim 22, wherein said microphone array system is implemented in one of devices with speech acquisition capability, hands-free devices, handheld devices, conference phones and video conferencing applications, wherein said handheld devices comprise smart phones, tablet computers and laptop computers.*

*41. The system of claim 30, wherein said microphone array system is implemented in one of devices with speech acquisition capability, hands-free devices, handheld devices, conference phones and video conferencing applications, wherein said handheld devices comprise smart phones, tablet computers and laptop computers.*

* * * * *